(12) United States Patent
Sytnik et al.

(10) Patent No.: US 11,481,882 B2
(45) Date of Patent: Oct. 25, 2022

(54) SYSTEMS AND METHODS FOR SELECTIVE REPLACEMENT OF OBJECTS IN IMAGES

(71) Applicant: Shinyfields Limited, Nicosia (CY)

(72) Inventors: Dmitry Sytnik, Kyiv (UA); Andrey Frolov, Kyiv Oblast (UA)

(73) Assignee: SHINYFIELDS LIMITED, Nicosia (CY)

( * ) Notice: Subject to any disclaimer, the term of this patent is extended or adjusted under 35 U.S.C. 154(b) by 154 days.

(21) Appl. No.: 16/951,872

(22) Filed: Nov. 18, 2020

(65) Prior Publication Data

US 2021/0150682 A1 May 20, 2021

Related U.S. Application Data

(60) Provisional application No. 62/936,845, filed on Nov. 18, 2019.

(51) Int. Cl.
| | |
|---|---|
| *G06T 5/50* | (2006.01) |
| *G06T 19/00* | (2011.01) |
| *G06T 11/60* | (2006.01) |
| *G06T 3/40* | (2006.01) |
| *G06T 7/11* | (2017.01) |

(52) U.S. Cl.
CPC ............. *G06T 5/50* (2013.01); *G06T 3/4046* (2013.01); *G06T 7/11* (2017.01); *G06T 11/60* (2013.01); *G06T 19/006* (2013.01); *G06T 2207/20216* (2013.01)

(58) Field of Classification Search
CPC .......... G06T 5/50; G06T 7/01; G06T 3/4046; G06T 11/60; G06T 19/006
USPC ......................................................... 382/284
See application file for complete search history.

(56) References Cited

U.S. PATENT DOCUMENTS

| | | | | |
|---|---|---|---|---|
| 2007/0189615 A1* | 8/2007 | Liu | ...................... | G06V 10/28 382/232 |
| 2016/0035102 A1* | 2/2016 | Jerebko | .................. | G06T 7/155 382/131 |
| 2020/0151860 A1* | 5/2020 | Safdarnejad | ......... | G06V 40/168 |

(Continued)

OTHER PUBLICATIONS

"Dilation (morphology)", Wikipedia entry, archived Oct. 2, 2019: https://web.archive.org/web/20191002155651/https://en.wikipedia.org/wiki/Dilation_(morphology).

(Continued)

*Primary Examiner* — Gabriel I Garcia
(74) *Attorney, Agent, or Firm* — Brown Rudnick LLP

(57) ABSTRACT

Exemplary embodiments are directed to a system for selective replacement of an object in an image. The system includes an interface configured to receive as input an original image and a background image, and a processing device in communication with the interface. The processing device is configured to process the original image using a neural network to detect one or more objects in the original image, generate a neural network mask of the original image for the one or more objects in the original image, generate a filtered original image including the original image without the one or more objects, generate a modulated background image including a replacement background based on the neural network mask, and generate a combined image including the filtered original image combined with the modulated background image.

20 Claims, 34 Drawing Sheets
(27 of 34 Drawing Sheet(s) Filed in Color)

(56) References Cited

U.S. PATENT DOCUMENTS

2021/0019453 A1* 1/2021 Yang .................... G06T 19/006
2021/0097691 A1* 4/2021 Liu ......................... G06N 3/02

OTHER PUBLICATIONS

"Graph Transform Tool", GitHub Tensorflow Tools README file, archived Nov. 4, 2018: https://web.archive.org/web/20181104111318/https://github.com/tensorflow/tensorflow/blob/master/tensorflow/tools/graph_transforms/README.md.

Chen et al., "Encoder-Decoder with Atrous Separable Convolution for Semantic Image Segmentation", in Lecture Notes in Computer Science: Computer Vision—ECCV 2018, pp. 833-851.

Farbman et al., "Coordinates for Instant Image Cloning", in SIGGRAPH '09: ACM SIGGRAPH 2009 papers, Jul. 2009, Article No. 67, pp. 1-9.

He et al., "Guided Image Filtering", Proceedings of the European Conference on Computer Vision (ECCV) 2010, pp. 1-14.

He et al., "Guided Image Filtering", IEEE Transactions on Pattern Analysis and Machine Intelligence (vol. 35, Issue: 6, Jun. 2013), pp. 1397-1409.

Paris et al., "Local Laplacian Filters: Edge-aware Image Processing with a Laplacian Pyramid", ACM Transactions on Graphics (Proceedings of SIGGRAPH 2011), Communications of the ACM (Mar. 2015, vol. 58, No. 3).

Sandler et al., "MobileNetV2: Inverted Residuals and Linear Bottlenecks", Proceedings of the IEEE Conference on Computer Vision and Pattern Recognition (CVPR) 2 018, pp. 4510-4520.

* cited by examiner

SYSTEMS AND METHODS FOR SELECTIVE REPLACEMENT OF OBJECTS IN IMAGES

CROSS-REFERENCE TO RELATED APPLICATIONS

The present application claims the benefit of priority to U.S. Provisional Application No. 62/936,845, filed Nov. 18, 2019, which is hereby incorporated by reference in its entirety.

TECHNICAL FIELD

The present disclosure relates generally to computer-based systems and methods for altering or editing digital images. More specifically, the present disclosure relates to systems and methods for selective replacement of objects in images, in order to generate a realistic image in an efficient manner.

BACKGROUND

Replacement of objects, such as the sky, specific structures, people, or the like, in a digital image is often useful in various fields, such as business, photography, digital editing, and the like. The process of such replacement is generally not automatic, and often requires a wide range of different image editing tools to achieve the desired replacement. Depending on the image and the object to be replaced (e.g., the scene and the type of sky), different approaches for replacing the object may be implemented. As such, there is generally no universal approach for replacement of objects in images.

A need exists for systems and methods for selective replacement of objects in images that allow for an automatic and efficient process of replacement of the objects in images having varying complexities. The systems and methods of the present disclosure solve these and other needs.

SUMMARY

In accordance with embodiments of the present disclosure, an exemplary system for selective replacement of an object in an image is provided. The system includes an interface configured to receive as input an original image and a background image, and a processing device in communication with the interface. The processing device can be configured to process the original image using a neural network to detect one or more objects in the original image, generate a neural network mask of the original image for the one or more objects in the original image, generate a filtered original image including the original image without the one or more objects, generate a modulated background image including a replacement background based on the neural network mask, and generate a combined image including the filtered original image combined with the modulated background image.

The original image can include a foreground and a background. The one or more objects can include the background of the original input. In some embodiments, the one or more objects include a sky as the background in the original image. The processing device can be configured to extract the foreground from the original image. The processing device can be configured to generate a refined mask for each pixel of the original image associated with the background. The processing device can be configured to generate a dilated or indented mask including a dilation or indentation from a border extending between the foreground and the background. The processing device can be configured to generate an interpolation grid corresponding to the foreground. The processing device can be configured to generate an extracted image including the original image with the foreground extracted based on the interpolation grid. The processing device can be configured to generate the filtered original image by extracting the foreground of the original image based on the interpolation grid.

The processing device can be configured to generate a blended image, the blended image including a smooth transition between the filtered original image and the modulated background image. The processing device can be configured to generate a toned image, the toned image including the combined image with adjustment of tone within the combined image. The processing device can be configured to generate a tint unified image, the tint unified image including tint correction at edges between the filtered original image and the modulated background image. The processing device can be configured to adjust one or more characteristics of the filtered original image independently from one or more characteristics of the modulated background image.

In some embodiments, the interface can include an image selection section with the combined image and one or more additional original images. In such embodiments, the interface can include a first submenu for selecting the combined image and copying the adjustments or enhancements applied to the combined image, and the interface can include a second submenu for selecting one or more of the additional original images and applying the copied adjustments or enhancements of the combined image to the selected one or more of the additional original images.

In accordance with embodiments of the present disclosure, an exemplary method for selective replacement of an object in an image is provided. The method can include receiving as input at an interface an original image and a background image, detecting one or more objects in the original image with a neural network, and generating a neural network mask of the original image for the one or more objects in the original image. The method can include generating a filtered original image, the filtered original image including the original image without the one or more objects. The method can include generating a modulated background image, the modulated background image including a replacement background based on the neural network mask. The method can include generating a combined image, the combined image including the filtered original image combined with the modulated background image.

The method can include adjusting one or more characteristics of the filtered original image independently from one or more characteristics of the modulated background image. The method can include receiving at the interface one or more additional original images, wherein the interface includes an image selection section with the combined image and the one or more additional original images. The method can include selecting the combined image and copying the adjustments or enhancements applied to the combined image at a first submenu of the interface, and selecting one or more of the additional images and applying the copied adjustments or enhancements of the combined image to the selected one or more of the additional images at a second submenu of the interface.

In accordance with embodiments of the present disclosure, an exemplary non-transitory computer-readable medium storing instructions at least for selective replacement of an object in an image is provided. The instructions are executable by a processing device. Execution of the instructions by the processing device can cause the processing device to receive as input at an interface an original image and a background image, detect one or more objects in the original image with a neural network, and generate a neural network mask of the original image for the one or more objects in the original image. Execution of the instructions by the processing device can cause the processing device to generate a filtered original image, the filtered original image including the original image without the one or more objects. Execution of the instructions by the processing device can cause the processing device to generate a modulated background image, the modulated background image including a replacement background based on the neural network mask. Execution of the instructions by the processing device can cause the processing device to generate a combined image, the combined image including the filtered original image combined with the modulated background image.

Other features and advantages will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To assist those of skill in the art in making and using the disclosed systems and methods for selective replacement of objects in images, reference is made to the accompanying figures, wherein.

DETAILED DESCRIPTION

In accordance with embodiments of the present disclosure, exemplary systems for selective replacement of objects in images are provided to generate a realistic output image. As an example, the exemplary systems can be used to replace the sky in an input image with a replacement sky, with the output image providing no indication of replacement of the original sky. The exemplary systems generate an object mask using a neural network to identify the object (e.g., background sky) to be replaced in the image, generate a polygonal mesh to identify and extract additional objects (e.g., foreground) in the image to be maintained in the output image, generate a replacement or target sky based on the object mask, and combine the replacement or target sky with the maintained objects using the polygonal mesh to generate the output image. The exemplary systems can be used to replace the sky completely, to combine a new sky with an original sky, to combine an original sky with a new object (e.g., image augmentation), combinations thereof, or the like. Although discussed herein as being used to replace the sky of an image, it should be understood that the exemplary systems can be used to identify/detect and replace any object(s) in the image.

Figure 1:
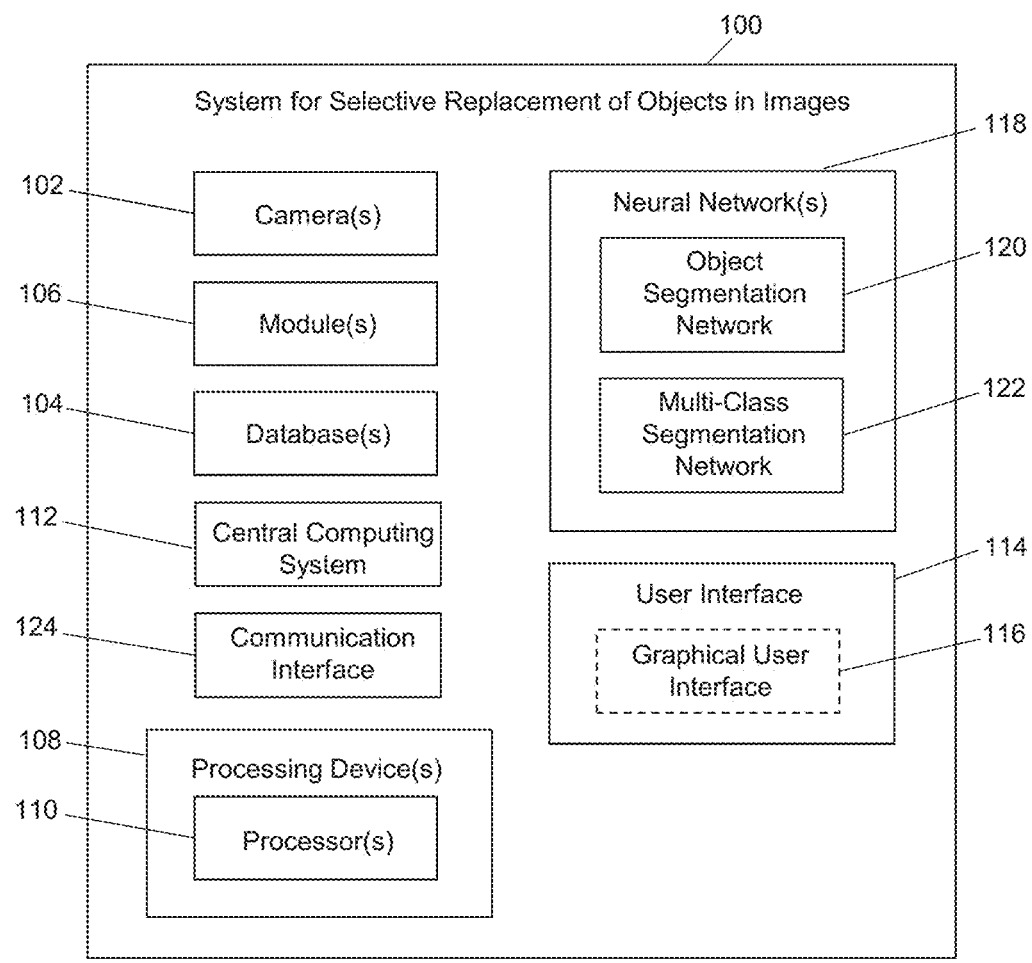
FIG. 1 is a block diagram of an exemplary system for selective replacement of objects in images in accordance with the present disclosure.

FIG. 1 is a block diagram of an exemplary system 100 for selective replacement of objects in images (hereinafter "system 100"). The system 100 includes one or more cameras 102 capable of capturing one or more digital images that can be received as input images by the system 100. The system 100 includes one or more databases 104 configured to receive and electronically store data corresponding to operation of the system 100, including data corresponding to images received, edited and/or enhanced by the system 100. The system 100 includes software units or modules 106 configured to be executed by a processing device 108 to edit, enhance and/or replace one or more portions of the input images. The processing device 108 can include one or more processors 110 for executing the modules 106.

The system 100 can include a central computing system 112 for controlling the steps performed by the system 100. In some embodiments, the central computing system 112 can include the one or more processing devices 108. The system 100 can include a user interface 114 (e.g., a device with a user interface), such as a user interface having a graphical user interface (GUI) 116. The GUI 116 can be used to input data and/or instructions into the system 100, and to output data and/or images to the user.

The system 100 can include one or more neural networks 118 executed by the processing device 108. The neural network 118 can include an object segmentation network 120 and a multi-class segmentation network 122. The network 118 can be trained via, e.g., manual input, machine learning, historical data input and analysis, combinations thereof, or the like, with sample images to assist in one or more steps of the process performed by the system 100. For example, the network 118 can be trained with sample images to detect and segment specific objects in input images. In one embodiment, the network 118 can be trained to recognize pixels in the input image that correspond with the sky (or with a high probability of corresponding with the sky). The networks 118 used can be small and fast to ensure efficient processing of the images within the system. The object segmentation network 120 can be selected to precisely segment objects (e.g., the sky) from the original image and to use quantization weights to reduce the size of the network. Augmentation can be used to artificially replace the sky in the original image.

In some embodiments, the object segmentation network 120 can be used to identify and segment the object to be replaced in the original image (e.g., the sky). The multi-class segmentation network 122 can include a dataset with a large number of classes (e.g., trees, humans, buildings, or the like) to identify and segment specific objects in the original image to be extracted and combined with a replacement object (e.g., a replacement sky). In some embodiments, the multi-class segmentation network 122 can be used for additional augmentations of the identified objects, e.g., random flip, random crop, random brightness, random rotation, affine transformation, combinations thereof, or the like. The system 100 can include a communication interface 124 configured to provide communication and/or transmission of data between the components of the system 100 shown in FIG. 1.

Figure 2:
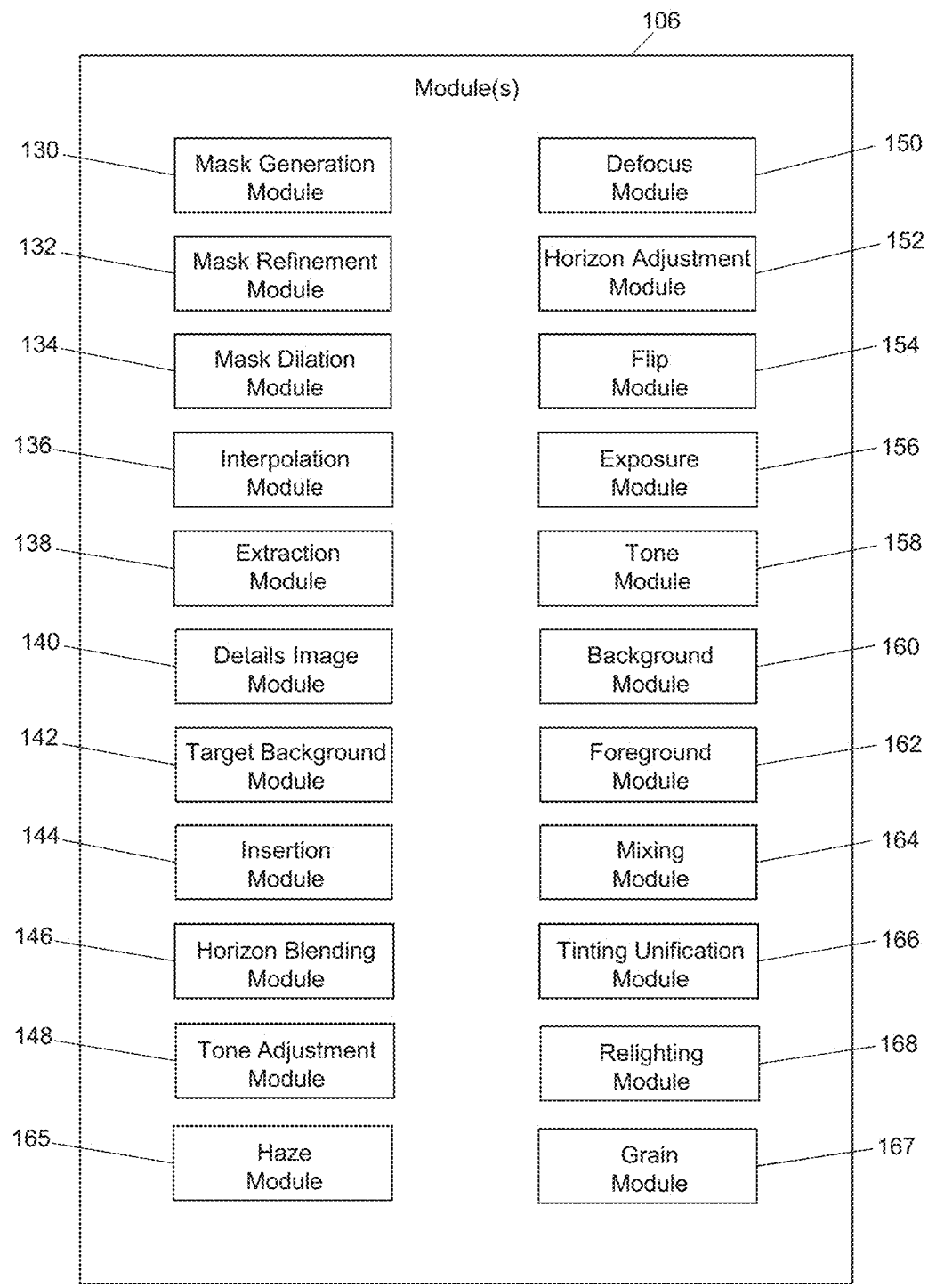
FIG. 2 is a block diagram of exemplary modules of a system for selective replacement of objects in images in accordance with the present disclosure.

FIG. 2 is a block diagram illustrating the software modules 106 of the system 100 in greater detail. Although illustrated as separate modules, in some embodiments, the modules can be combined or separated into one or more modules. For example, the modules can be combined into a single module and/or any of the modules can be distributed in the system 100. In some embodiments, the system 100 can include, e.g., a mask generation module 130, a mask refinement module 132, a mask dilation module 134, an interpolation module 136, an extraction module 138, a filter image module 140, a target background module 142, an insertion module 144, a horizon blending module 146, a tone adjustment module 148, a defocus module 150, a horizon adjustment module 152, a flip module 154, an exposure module 156, a tone module 158, a background module 160, a foreground module 162, a mixing module 164, a tinting unification module 166, a haze module 165, and a grain module 167. Execution and operation of each of the modules 106 will be discussed in detail below with reference to sample images.

Figure 3:
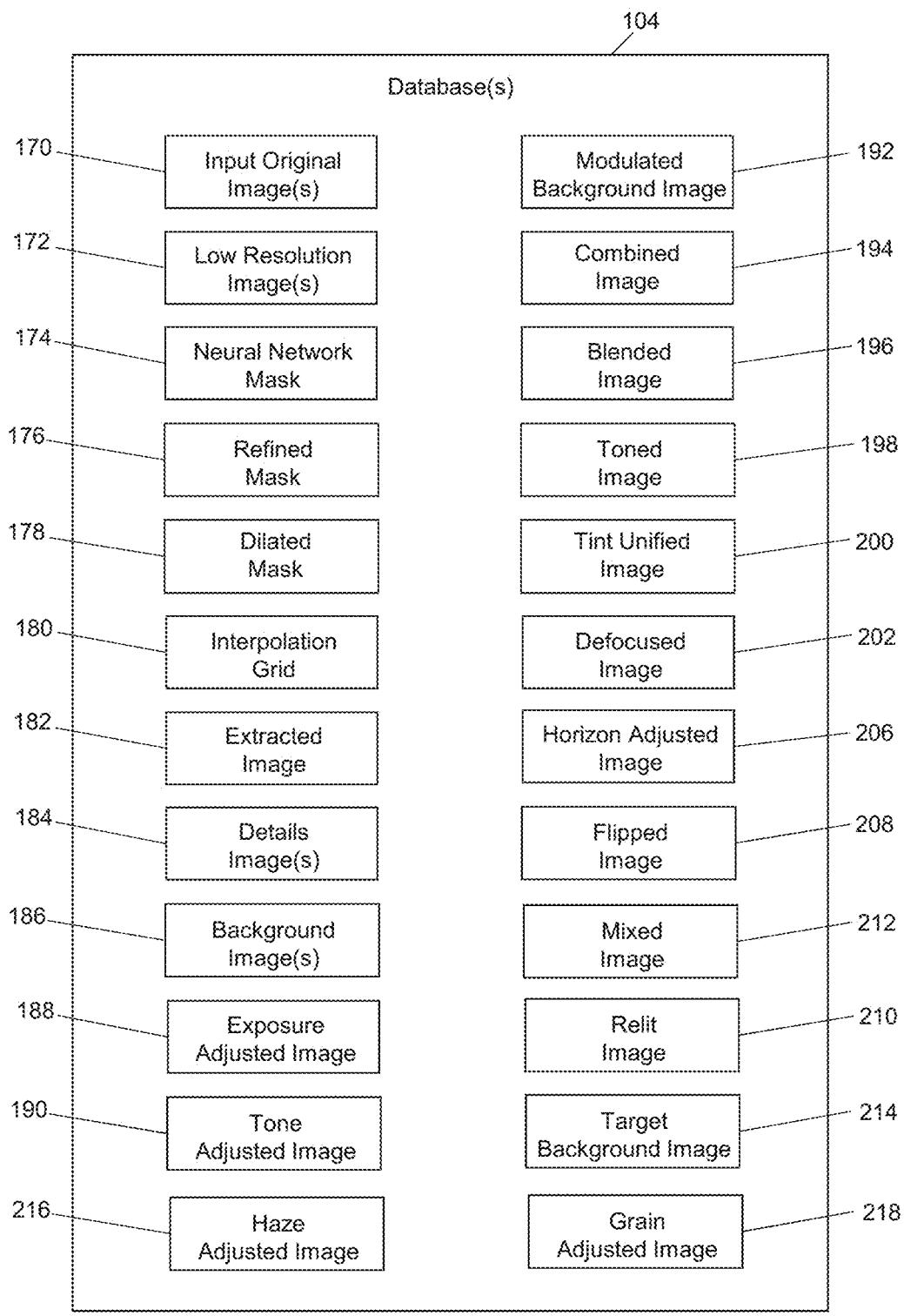
FIG. 3 is a block diagram of an exemplary database of a system for selective replacement of objects in images in accordance with the present disclosure.

FIG. 3 is a block diagram illustrating the database 104 of the system 100 in greater detail. The database 104 can electronically receive and/or store data corresponding to, e.g., input original images 170, low resolution images 172, neural network masks 174, refined masks 176, dilated masks 178, interpolation grids 180, extracted images 182, details images 184 (e.g., filtered original images), background images 186, exposure adjusted images 188, tone adjusted images 190, modulated background images 192, combined images 194, blended images 196, toned images 198, tint unified images 200, final images 202, defocused images 204, horizon adjusted images 206, flipped images 208, adjusted images 210, mixed images 212, haze adjusted images 216, grain adjusted images 218, or the like. The data electronically received and/or stored in the database 104 will be discussed in detail below with reference to sample images and the modules 106 of FIG. 2.

Figure 4A:
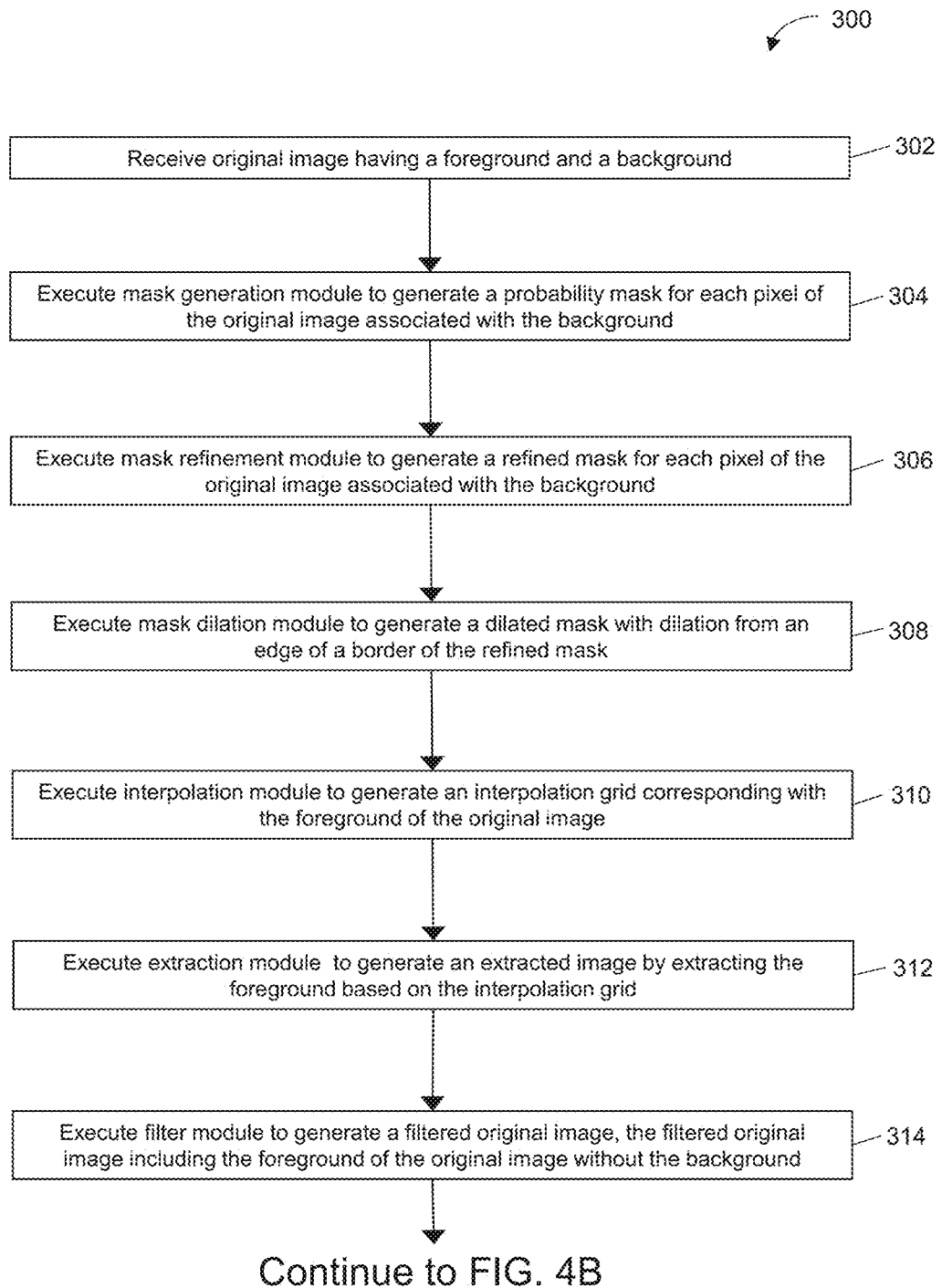
FIGS. 4A-4B are a flowchart illustrating an exemplary process of implementing a system for selective replacement of objects in images in accordance with the present disclosure.
Figure 4B:
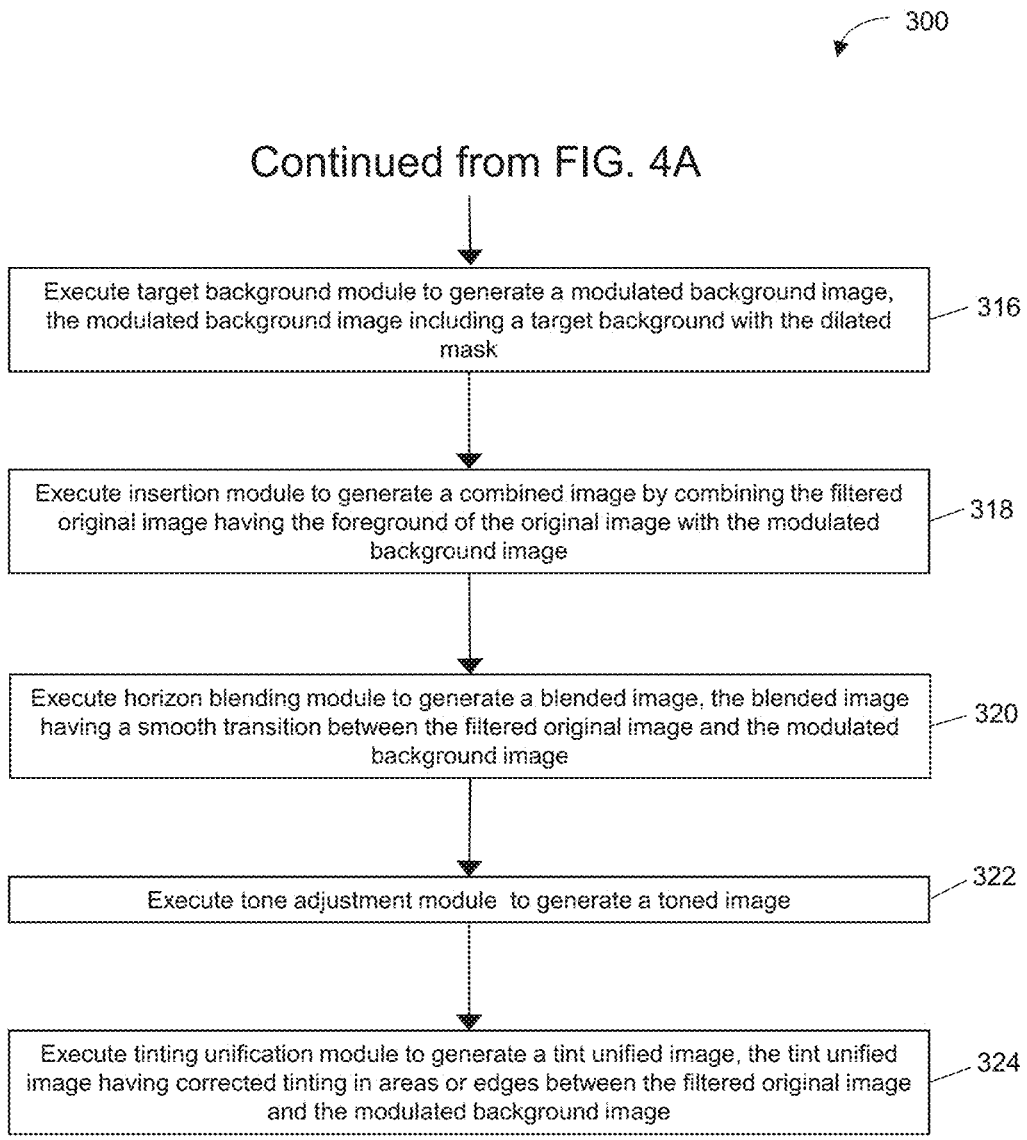

FIGS. 4A-4B are a flowchart 300 illustrating overall process steps executed by the system 100. To begin at step 302, an original image is received by the system, the image having a foreground and a background each with one or more objects. At step 304, the mask generation module can be executed by the processing device to generate a probability mask for each pixel of the original image associated with the background. At step 306, the mask refinement module can be executed by the processing device to generate a refined mask for each pixel of the original image associated with the background. At step 308, the mask dilation module can be executed by the processing device to generate a dilatedmask with dilation from an edge of a border of the refined mask. At step 310, the interpolation module can be executed by the processing device to generate an interpolation grid corresponding with the foreground of the original image. At step 312, the extraction module can be executed by the processing device to generate an extracted image by extracting the foreground based on the interpolation grid. At step 314, the filter module can be executed by the processing device to generate filtered original image including the foreground of the original image without the background.

At step 316, the target background module can be executed by the processing device to generate a modulated background image including a target background with the dilated mask. At step 318, the insertion module can be executed by the processing device to generate a combined image by combining the filtered original image having the foreground of the original image with the modulated background image. At step 320, the horizon blending module can be executed by the processing device to generate a blended image having a smooth transition between the filtered original image and the modulated background image. At step 322, the tone adjustment module can be executed by the processing device to generate a toned image. At step 324, the tinting unification module can be executed by the processing device to generate a tint unified image having corrected tinting in areas or edges between the filtered original image and the modulated background image. Details of the process 300 and additional optional steps will be discussed in greater detail below in combination with the sample images.

Figure 5:
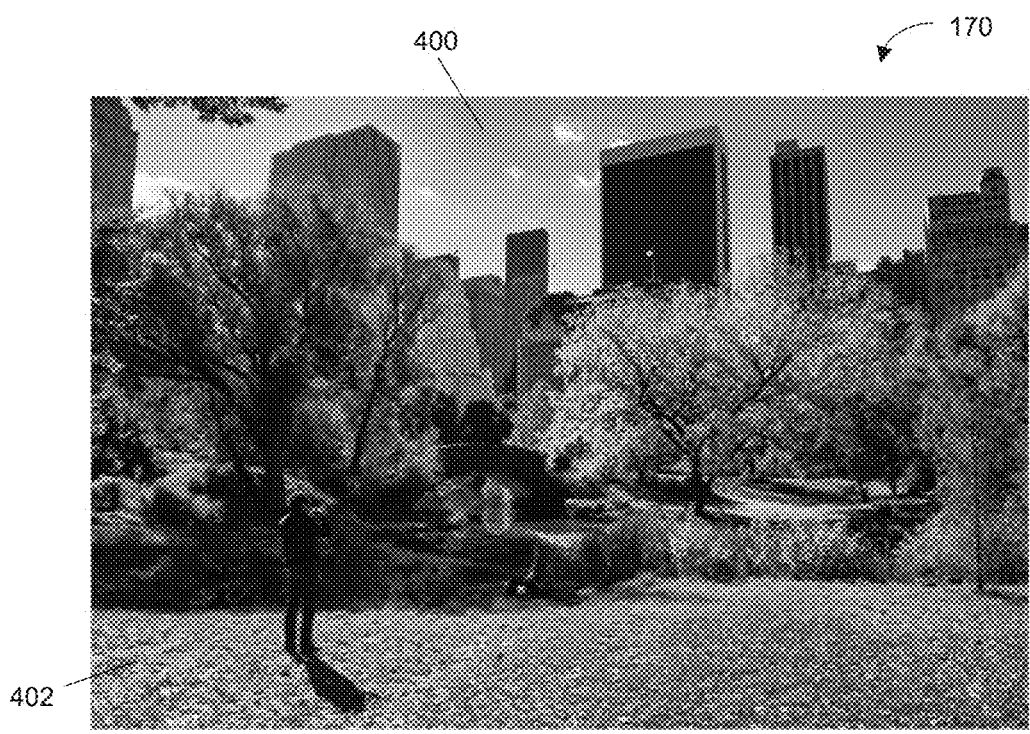
FIG. 5 is an exemplary input original image in accordance with the present disclosure.

With reference to FIG. 5, an exemplary input original image 170 is provided. The image 170 can be received as input by the system 100 and electronically stored in the database 104. Each input original image 170 includes a background 400 and a foreground 402, each with one or more identifiable or segmentable objects. For example, the background 400 in FIG. 5 can include the sky and clouds, and the foreground 402 can include the buildings, trees, grass, hills, people, or the like. In some embodiments, the system 100 can generate a low resolution image 172 (see FIG. 6) of the input original image 170 for further processing to optimize or improve the operational speed of the system 100 in replacing one or more objects in the input original image 170. The low resolution image 172 can be electronically stored in the database 104. Although operation of the system 100 is discussed with respect to the low resolution image 172, in some embodiments, the system 100 can perform the steps discussed herein with the input original image 170.

Figure 6:
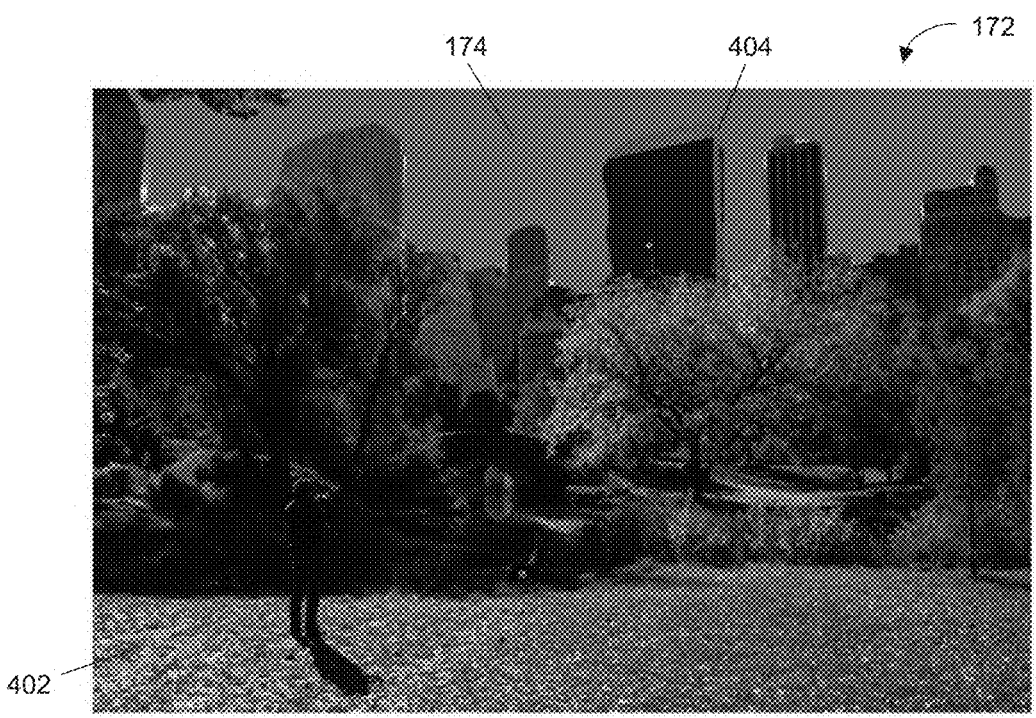
FIG. 6 is an exemplary image including a neural network mask in accordance with the present disclosure.

With reference to FIG. 6, the mask generation module 130 can receive as input the low resolution image 172 (or the input original image 170), and is executed by the processing device 108 to generate a neural network mask 174 to be electronically stored in the database 104. The mask generation module 130 can operate in combination with the neural network 118 to recognize and segment specific objects or portions of the image 172. For example, the object segmentation network 120 of the neural network 118 can be trained to detect, define and segment the sky as the background 400 of the image 172. The mask generation module 130 and the neural network 118 thereby receive as input the image 172 and generate a probability mask (e.g., neural network mask 174) for each pixel of the image 172 in which the sky is detected. For clarity, FIG. 5 illustrates the neural network mask 174 in red. In some embodiments, the neural network mask 174 may not be sufficiently accurate due to potential overlap at the border or edge 404 between the neural network mask 174 and the foreground 402 between the neural network mask 174 and edges of buildings, trees, small and thin objects, or the like. As such, refinement of the neural network mask 174 can be performed.

Figure 7:
FIG. 7 is an exemplary image including a refined mask in accordance with the present disclosure.

With reference to FIG. 7, the mask refinement module 132 can receive as input the low resolution image 172 with the neural network mask 174, and is executed by the processing device 108 to generate a refined mask 176 to be electronically stored in the database 104. In some embodiments, the neural network mask 174 can be refined using probabilistic color models. As a color model, a three-dimensional histogram can be used where the coordinates of the cells (e.g., bins) are the color values of the red-green-blue (RGB) pixels. Equations 1-5 below can be used for the probabilistic color models:

$$\text{float skyHist } [N] [N] [N] \tag{1}$$

$$\text{float nonSkyHist } [N] [N] [N] \tag{2}$$

$$\text{Int } x = \text{pixel}.r * (N-1) \tag{3}$$

$$\text{Int } y = \text{pixel}.g * (N-1) \tag{4}$$

$$\text{Int } z = \text{pixel}.b * (N-1) \tag{5}$$

where N is a dimension equal to 8. Two histograms can be used to count pixels under the mask 174 of the sky (one histogram) and pixels outside the mask 174 of the sky (second histogram) (e.g., skyHist and nonSkyHist). After counting, the histograms can be normalized by dividing by the number of pixels in each histogram. The result can be a model of the probability distribution of colors. The refined mask can be generated by comparing the probability distribution of colors using Equation 6 below:

$$\text{refinedIsSkyPixel} = \text{skyHist } [z] [y] [x] > \text{nonSkyHist } [z] [y] [x] \tag{6}$$

Figure 8:
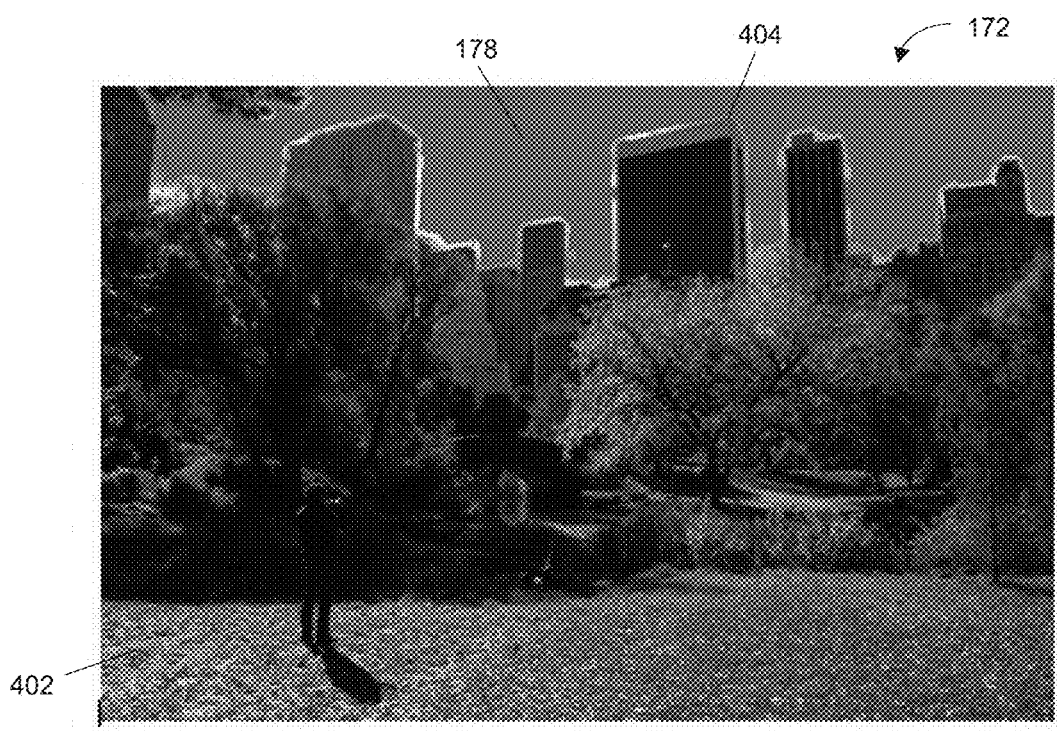
FIG. 8 is an exemplary image including a dilated mask in accordance with the present disclosure.

With reference to FIG. 8, the mask dilation module 134 (e.g., mask indentation module) can receive as input the low resolution image 172 and the refined mask 176, and is executed by the processing device 108 to generate a dilated mask 178 (e.g., an indented mask). In particular, after constructing the neural network mask 174 and/or the refined mask 176, the mask dilation module 134 generates dilation or indentation from the edge 404 of the border of the refined mask 176 for reliable operation of future transformations. In some embodiments, an inversion mask can be used to indent from the edges 404. The indent/dilation distance or parameter (e.g., fix gap) defines the distance for indenting from the edges 404 and can be adjusted using a manual adjustment slider in the user interface 114 and/or automatically set by the system 100. In some embodiments, the system 100 can use a predetermined or default constant value for the indent/dilation distance. The mask dilation module 134 therefore ensures that the dilated mask 178 accurately captures the sky without capturing or overlapping with undesired objects of the foreground 402. Particularly, the dilated mask 178 ensures that only the object to be replaced is selected in the image 170 by capturing all pixels associated with the background.

Figure 9:
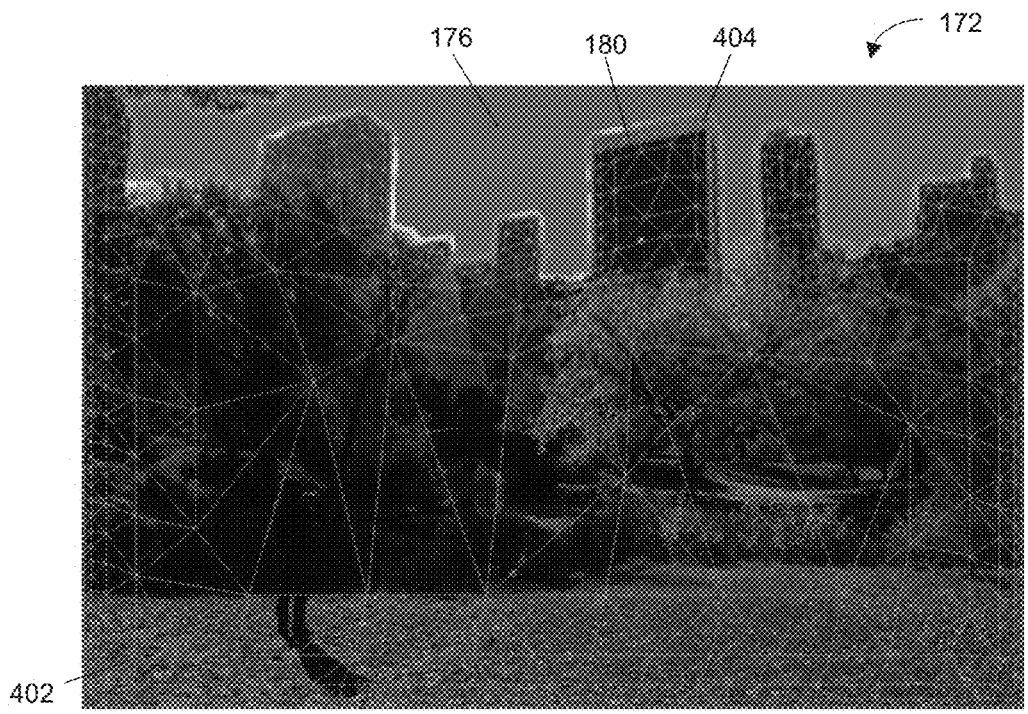
FIG. 9 is an exemplary image including an interpolation grid in accordance with the present disclosure.

With reference to FIG. 9, the interpolation module 136 can receive as input the low resolution image 172 and the dilated mask 178, and is executed by the processing device 108 to generate an interpolation grid 180. The interpolation grid 180 (e.g., a polygonal grid) can be constructed to interpolate or extrapolate the background (e.g., sky) using mean value coordinates interpolation. The interpolation grid 180 can be generated using the dilated mask 178 by identifying pixels along the edge or contour of the dilated mask 178 and smoothing the colors at each point associated with the interpolation grid 180. The interpolation grid 180 provides a polygonal grid that identifies the foreground 402 of the image 172. The generated interpolation grid 180 can be used by the system 100 to extract or erase the foreground 402 geometry from the background 400 to build a potentially endless background 400 (e.g., sky) behind the extracted foreground 402.

Figure 10:
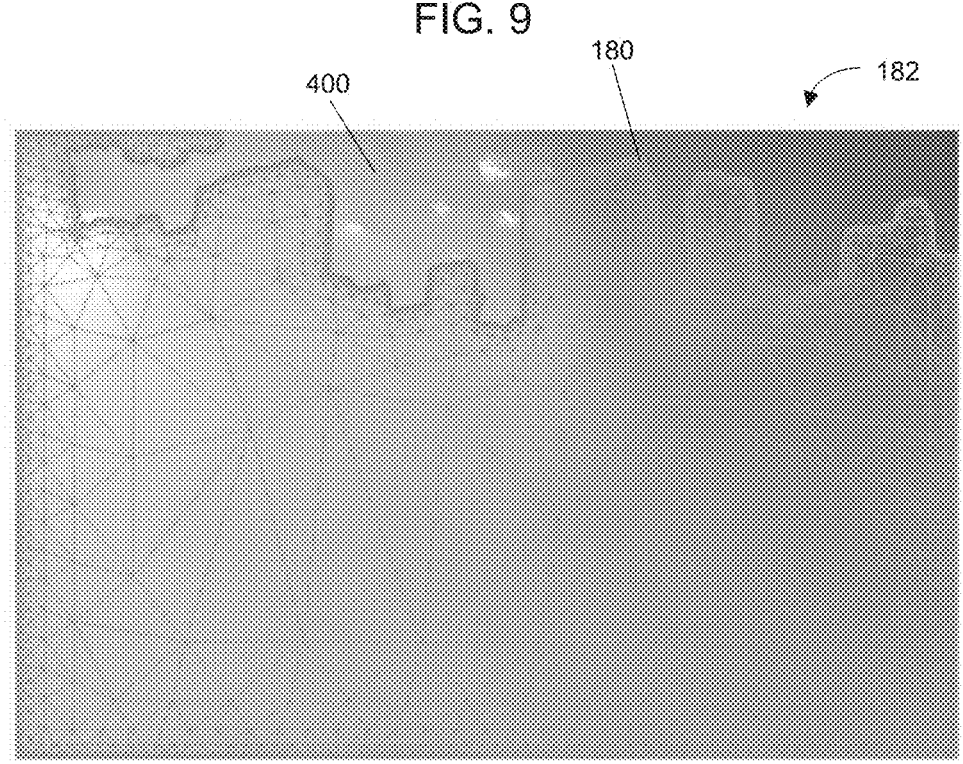
FIG. 10 is an exemplary image with a foreground extracted and including an interpolation grid in accordance with the present disclosure.
Figure 11:
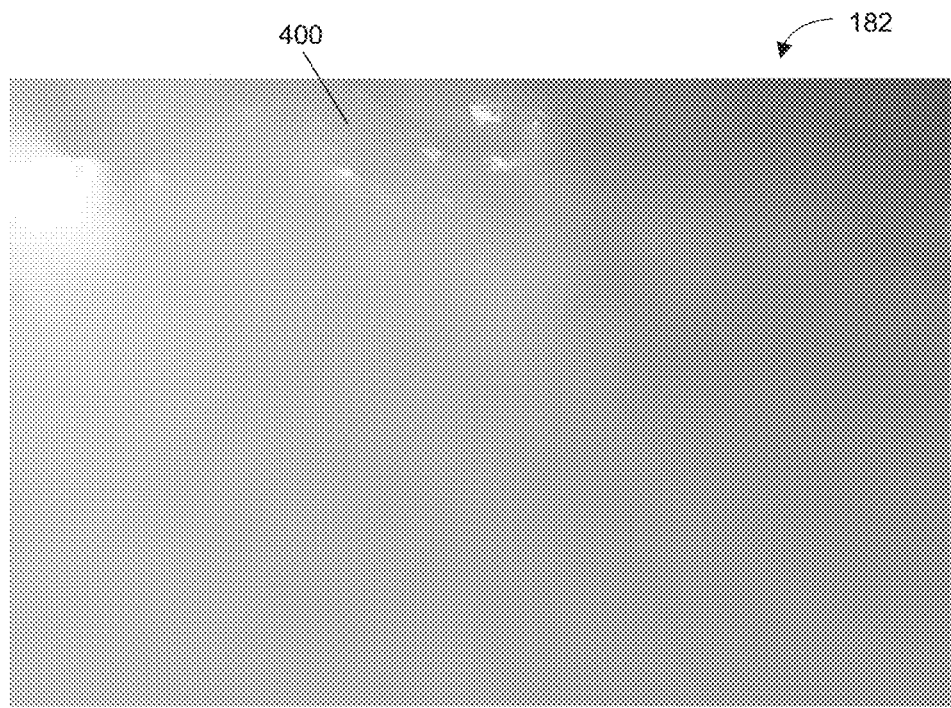
FIG. 11 is an exemplary image with a foreground extracted in accordance with the present disclosure.

With reference to FIG. 10, the extraction module 138 can receive as input the low resolution image 172 and the interpolation grid 180, and is executed by the processing device 108 to extract the foreground 402 represented by the interpolation grid 180 from the image 172. The result of such extraction is the extracted image 182 of FIG. 10, which shows the interpolation grid 180 for clarity. The colors of the sky or background 400 under the objects represented by the interpolation grid 180 can be estimated by the system 100 to represent the potential sky under the extracted geometry. FIG. 11 shows the extracted image 182 without the interpolation grid 180. The extracted image 182 thereby only includes the background 400 of the image 172.

Figure 12:
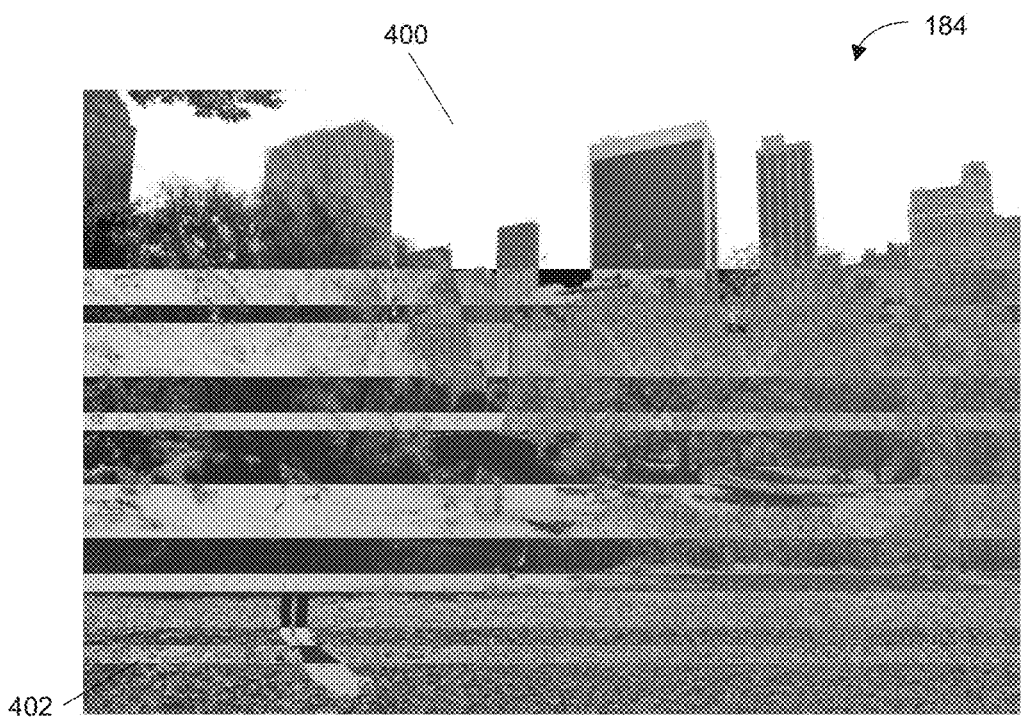
FIG. 12 is an exemplary details image in accordance with the present disclosure.

With reference to FIG. 12, the details image module 140 can receive as input the low resolution image 172 (or the input original image 170), the interpolation grid 180 with the foreground 402 data, and the extracted image 182, and is executed by the processing device 108 to generate a details image 184. The details image 184 includes only the deltas obtained from the differences between the image 172 and the extracted image 182. The process of the details image module 140 can be represented by Equation 7 below:

$$\text{OriginalDetailsMap}=abs(\text{OriginalImage}-\text{SrcSkyBox}) \quad (7)$$

where OriginalImage is either the low resolution image 172 or the input original image 170, SrcSkyBox is the extracted image 182, and OriginalDetailsMap is the details image 184. Equations 8-9 can be used to represent the more detailed process of obtaining the OriginalDetailsMap:

$$dp = RGB2LAB(\text{OriginalImage}) - RGB2LAB(\text{SrcSkyBox}) \quad (8)$$

$$\text{OriginalDetailsMap} = sqrt(dp.r \ast dp.r + dp.g \ast dp.g + dp.b \ast dp.b) \quad (9)$$

where OriginalImage is the original image, and SrcSkyBox is the original sky with the erased foreground objects (e.g., the extracted image 182).

Figure 13:
FIG. 13 is an exemplary refined mask image in accordance with the present disclosure.

A more refined mask 176 can be generated as represented by Equations 10-11:

$$\text{amount}=0.16\ast(\text{isPlant}(\ )?\ 2.8:1.0)\ast\text{amountThreshold} \quad (10)$$

$$\text{DetailsBinaryMask}=\text{OriginalDetaiilsMap}<\text{amount}?\ 1:0 \quad (11)$$

where isPlant( ) is a function that returns the mask of probabilities of vegetation received from the neural network 118 that segments the input original image 170 (e.g., the neural network mask 174), amountThreshold is a precision setting set by the system 100 (e.g., a SkyGlobal parameter), and DetailsBinaryMask is the refined mask 176. An example of the refined mask is shown in FIG. 13. The threshold value can be incorporated into the process as shown in Equation 10. In some embodiments, the system 100 can set the threshold value as about 0.3. In some embodiments, the threshold value can be controlled by a slider in the user interface 114, including an incremental range from 0 to 1. In some embodiments, the threshold value can be selected to be in a range of about 0.2 to about 0.5. The details image module 140 therefore "subtracts" the extracted image 182 from the image 170 or image 172 to obtain the details image 184 having only the extracted geometry of the foreground 402. The extracted image 182 can be considered as a filtered original image when determining the difference between the extracted image 182 and the original image. The output details image 184 can be an analogue of the high-frequency band or details of the input original image 170, including all elements or objects except for the original sky or background 400. As described below, the details image 184 can be used to generate the refined mask 176 and illustrates the details transferred onto a new target or replacement sky by the modulation of Equation 12 (below).

Figure 14:
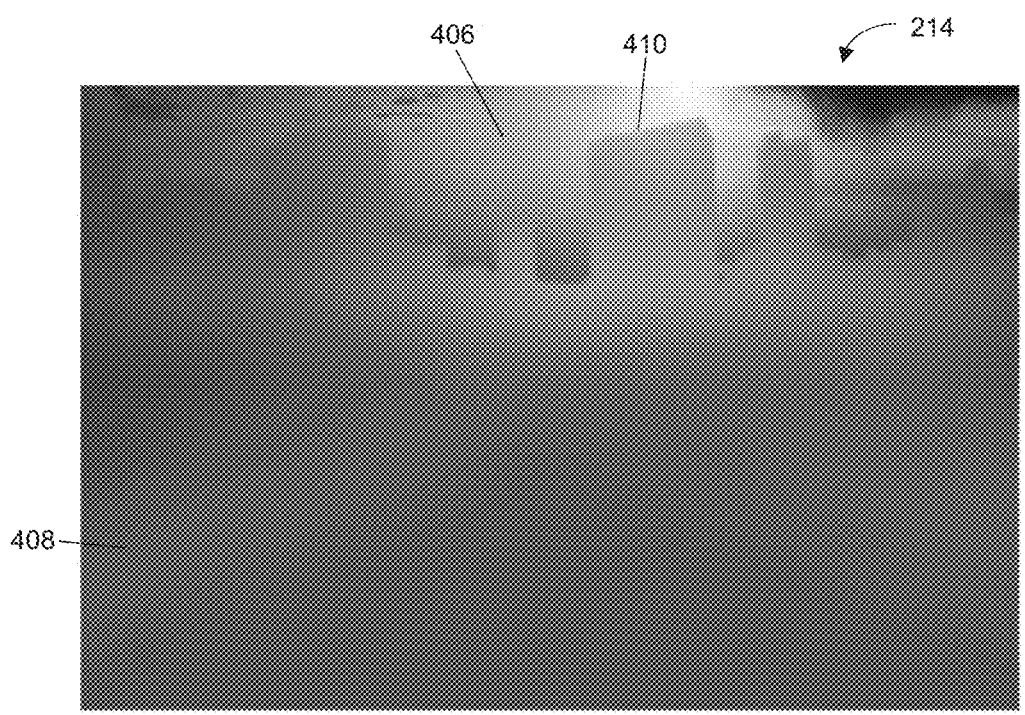
FIG. 14 is an exemplary target background image in accordance with the present disclosure.

With reference to FIG. 14, the target background module 142 can receive as input the DetailsBinaryMask (e.g., the refined mask 176) from Equation 11 and a background image 186, and is executed by the processing device 108 to generate a target background image 214. The target background image 214 is intended to underlie the details shown in the details image 184 as the new or replacement background. The refined mask 176 is used by the target background module 142 using a threshold value and applied to the input background image 186 to create a new or replacement background 406. The threshold value can be incorporated into the process as shown in Equation 11 above. In some embodiments, the system 100 can set the threshold value as about 0.3. In some embodiments, the threshold value can be controlled by a slider in the user interface 114 from and including 0 to 1. In some embodiments, the threshold value can be selected between about 0.2 to about 0.5. An edge or border 410 between the replacement background 406 and the underlying background 408 is generated based on the refined mask 176 to correspond with the edge or border of the image 172 to accommodate the details image 184 in a subsequent step.

The underlying background 408 to be covered by the details shown in the details image 184 can be blended or blurred by the target background module 142 to have a similar color scheme as the replacement background 406. The blended or blurred image can be superimposed on the target sky using the DetailsBinaryMask of Equation 12 to generate the target background image 214. The underlying background 408 can be heavily blurred using a summed area table based on the target background image 214, creating the effect of frosted glass. The summed area table or integral image can be used to blur with a different radius closer to the bottom of the image 214, such that a stronger blur is gradually generated in the direction of the bottom of the image 214. The new sky texture can be inserted such that the lower part of the sky touches or is in contact with the lower edge of the border 410 from the refined mask 176, with the border 410 treated as the horizon for the image 214. In some embodiments, the system 100 can be used to rotate the horizon (thereby rotating the replacement background 406) to match the inclination of the sky or background 400 in the input original image 170. In some embodiments, the system 100 can be used to shift the horizon along the y-axis (e.g., vertically). The replacement background 406 generated by the target background module 142 ensures that details within the image receive the replacement background 406. For example, rather than attempting to fill in gaps between leaves or branches of the tree in the image 170, the system 100 generates a completely new background 406 on which the details of the image 170 can be placed.

Figure 15:
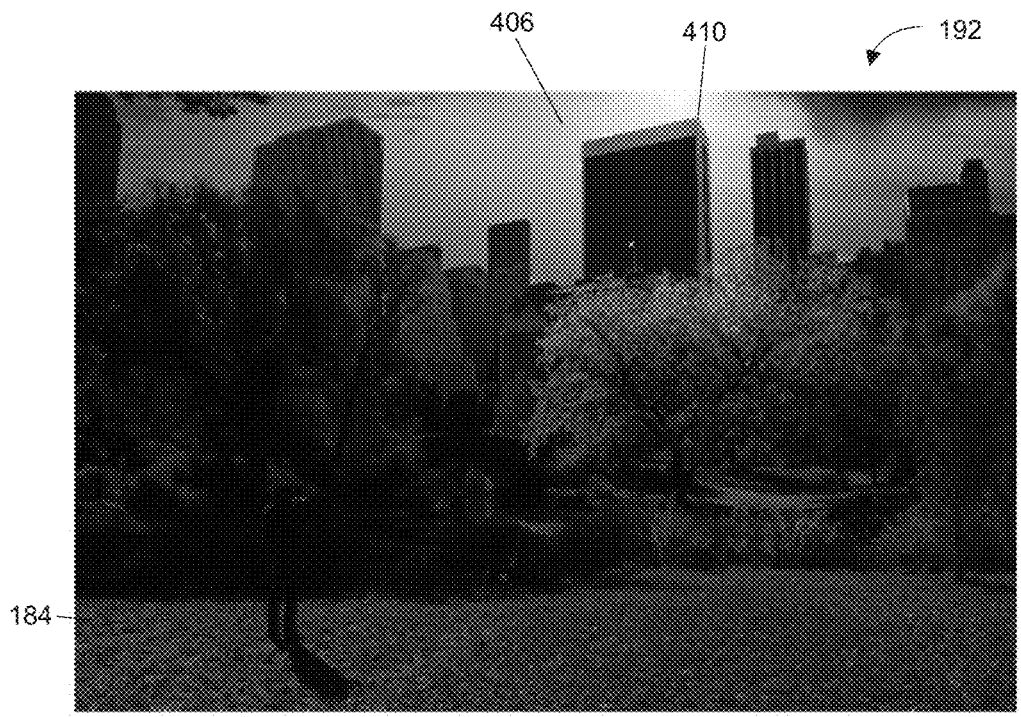
FIG. 15 is an exemplary modulated background image in accordance with the present disclosure.

With reference to FIG. 15, the insertion module 144 can receive as input the original image 170 (or image 172), the target background image 214 and the extracted image 182, and is executed by the processing device 108 to generate a modulated background image 192 to place the details of the input original image 170 on the target or replacement sky. The insertion module 144 modulates the pixels of the input original image 170 by the pixel ratio of skyboxes using Equation 12 below:

$$Dst=Src*DstSkyBox/SrcSkyBox \tag{12}$$

where DstSkyBox is the target background image 214 and SrcSkyBox is the extracted image 182. Details of the image are transferred because on the target background image 214 the relationship between DstSkyBox and SrcSkyBox in Equation 12 changes insignificantly and affects the overall brightness in the image, and the details are formed by multiplying by Src in Equation 12. The details image 184 is therefore used to generate the binary mask to identify the details to be transferred.

In order to reduce the distortion of the target background image 214 of Equation 12, the insertion module 144 can be executed by the processing device 108 to perform a PreserveColor operation represented by Equations 13-15 below:

float toGray(Pixel p) {return sqrt(p.r*p.r+p.g*p.g+
p.b*p.b)/3;} (13)

Pixel $dp=Src-SkyBoxSrc;$ float $v=$toGray($dp*dp$);

$v=$clampValue($v*30$);

Interpolation function: lerp(a, b, amount) {return
a+(b−a)*amount;} float graySrc=toGray(SkyBoxSrc); (14)

SkyBoxSrc=lerp(SkyBoxSrc, lerp(SkyBoxSrc, Pixel
(graySrc), v), amountPreserveColor)

float grayDst=toGray(SkyBoxDst); (15)

SkyDst=lerp(SkyBoxDst, lerp(SkyBoxDst, Pixel(g-
rayDst), v), amountPreserveColor)

where v represents the details mask, Src represents the input original image 170, SkyBoxSrc represents the extracted image 182, the interpolation function represents lerp, Equation 14 desaturates the SkyBoxSrc under-matted region, SkyBoxDst represents the target background image 214, and Equation 15 represents desaturation of SkyDst. In the refined mask 176, the pixels are discolored such that their ratio does not distort the color of the target background image 214. In particular, the matte areas of the refined mask 176 are discolored such that when the details are transferred to the target background image 214, the colors are less distorted during modulation. The amountPreserveColor portion of Equation 15 is the parameter affecting the strength of the discoloration correction.

In some embodiments, the insertion module 144 can operate in combination with the horizon blending module 146 to generate a smooth transition between the old/original sky and the new/replacement sky. When generating a matte substrate, the gradient can be applied to the new/replacement sky at the horizon level, resulting in translucency of the old/original sky. The degree or power of transillumination and smoothness of blurring can be adjusted by a setting/solider at the user interface 114 to smoothly combine the new/replacement sky into the old/original sky. Such transition can be generated when there is a strong discrepancy between the original and the new sky, resulting in a smoother and more realistic transition.

Figure 16:
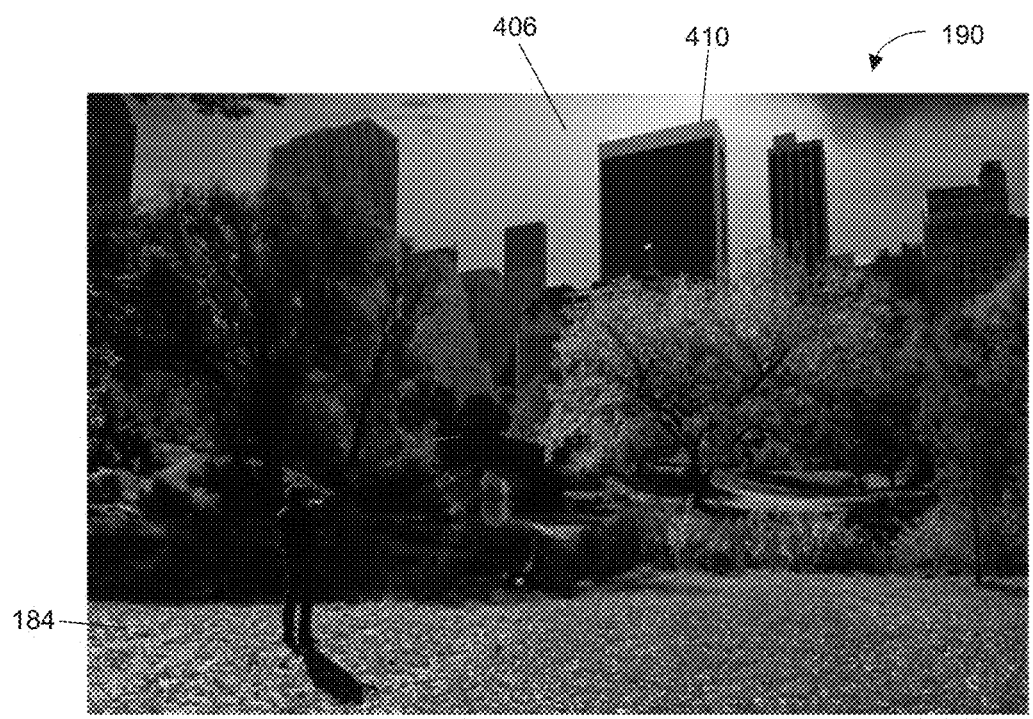
FIG. 16 is an exemplary tint unified image in accordance with the present disclosure.

With reference to FIG. 16, the tone adjustment module 148 can receive as input the modulated background image 192, and is executed by the processing device 108 to generate a tone adjusted image 190. The tone adjustment module 148 improves the tone of the modulated background image 192 to correct the tinting within the image 192. The tone adjustment module 148 provides a more realistic result by adjusting the tinting of the image 192 to a tone closer or similar to the input original image 170. In operation, the tone adjustment module 148 can overlay the input original image 170 over the masked modulated background image 192. The masked tone adjusted image 190 can be generated from the original details in the input original image 170 obtained in the details image 184. Using the neural network mask 174 allows for a more accurate approach to detecting and identifying meditation with small details. For example, the neural network 118 can be trained to detect different types of objects in the image 170 (e.g., vegetation, structures, people, or the like) and in instances where vegetation shines through stronger than other areas of the image, the neural network mask 174 allows for appropriate adjustment of the tone, resulting in a more realistic output. FIG. 16 provides a tone adjusted image 190 having a reduction of excess toning for a more realistic view of the image 192.

With reference to FIG. 16, the tinting unification module 166 can receive as input the image 170 (or image 172), the modulated background image 192, and the refined mask 176 from Equation 11, and is executed by the processing device to generate a tint unified image 200. The tinting unification module 166 can correct or enhance the tinting discrepancies in areas at or near the border 410 between the replacement background and foreground. For example, the areas of the sky and foreground may not be well coordinated with each other after the mixing and enhancement steps discussed above. Hard spots may appear at the boundaries or border 410 of the two regions. To coordinate the tone and eliminate stains, a guided filter can be used with a details mask (e.g., refined mask 176) obtained from the brightness of details in the input original image 170 as an input image with a large radius to adjust the tinting at the border 410. The guided filter can be used to blur the refined mask 176 from Equation 11, the image 170 (or image 172) and the modulated background image 192 to blend the two images 170, 192. After the tint in the image 170 is corrected, in some embodiments, the tint unified image 200 of FIG. 16 can be output as the final combined image 194.

Figure 17:
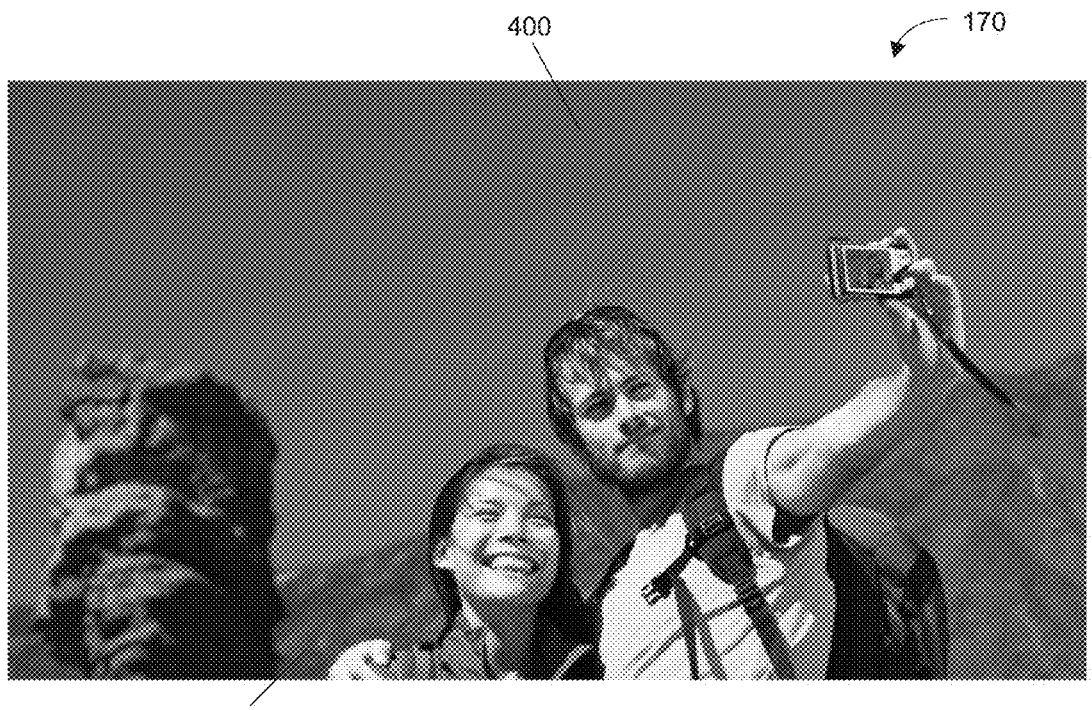
FIG. 17 is an exemplary input original image in accordance with the present disclosure.
Figure 18:
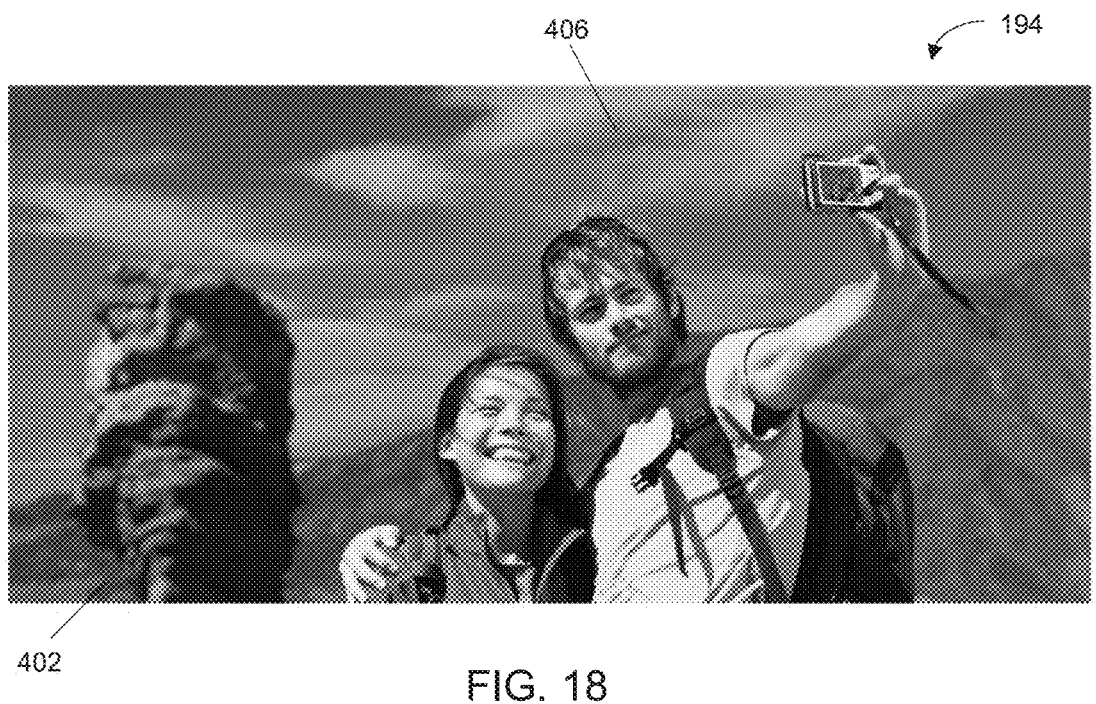
FIG. 18 is an exemplary combined image in accordance with the present disclosure.
Figure 19:
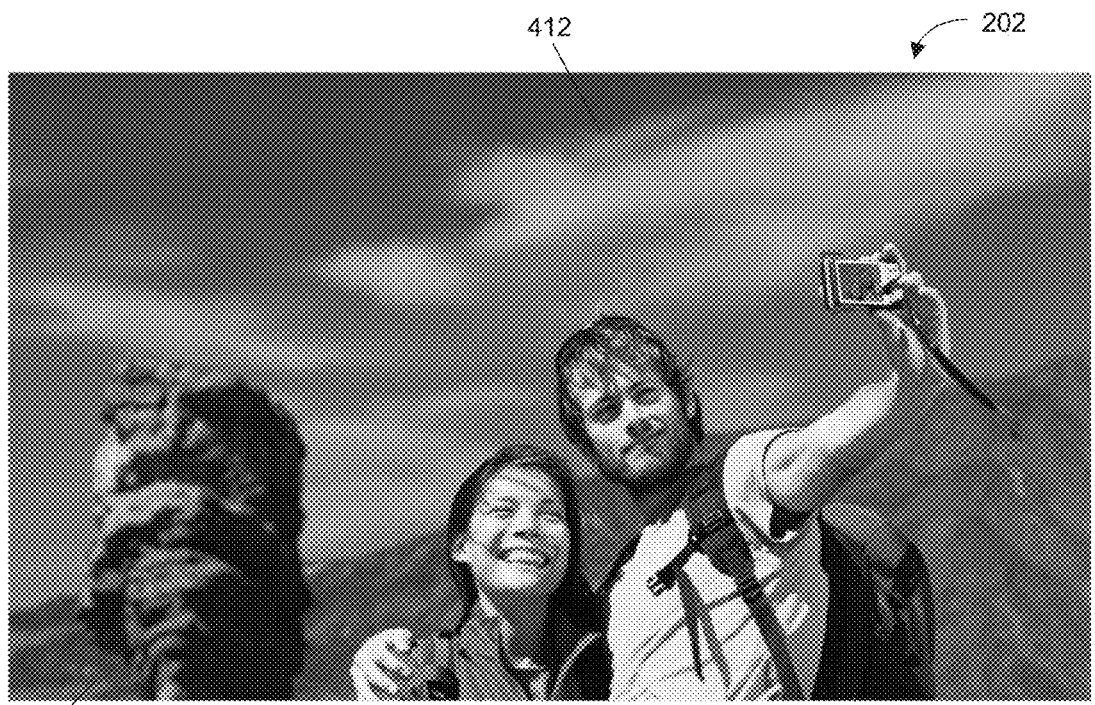
FIG. 19 is an exemplary defocused image in accordance with the present disclosure.

In some embodiments, additional adjustments or enhancements to the combined image 194 can be made by the system 100. For example, FIG. 17 is an input original image 170 having a background 400 and a foreground 402. FIG. 18 is a combined image 194 with a replacement background 406. If one or more portions of the foreground 402 or original background 400 are out of focus, insertion of a replacement background 406 having a crisp or in-focus representation may not appear realistic in the combined image 194. In such instances, the defocus module 150 can receive as input the combined image 194, and is executed by the processing device 108 to generate a defocused image 202 shown in FIG. 19. The defocused image 202 includes a background 406 having a blurriness substantially aligned with the remaining focus of the image 202. The force parameter associated with the intensity of the defocus effect can be selected by the operator via, e.g., a slider control at the user interface 114, and/or automatically by the system 100.

Figure 20:
FIG. 20 is an exemplary combined image in accordance with the present disclosure.
Figure 21:
FIG. 21 is an exemplary horizon adjusted image in accordance with the present disclosure.

As a further example, FIG. 20 is a combined image 194 with a replacement background 406. Due to the position of the replacement background 406 along the vertical y-axis and/or the zoom level of the replacement background 406, the combined image 194 may appear unrealistic. In such instances, the horizon adjustment module 152 can received as input the combined image 194, and is executed by the processing device 108 to generate a horizon adjusted image 206 of FIG. 21. The zoom and/or offset of the replacement background 406 along the y-axis can be adjusted by the user via the user interface 114 (e.g., one or more sliders of the interface) and/or automatically by the system 100 via the horizon adjustment module 152 to more accurately adjust the horizon, resulting in a realistic output image.

Figure 22:
FIG. 22 is an exemplary combined image in accordance with the present disclosure.
Figure 23:
FIG. 23 is an exemplary relit image in accordance with the present disclosure.

As a further example, FIG. 22 is a combined image 194 with a replacement background 406. Due to the difference in lighting between the replacement background 406 and the foreground 402, the combined image 194 may appear unrealistic. In such instances, the relighting module 168 can receive as input the combined image 194, and is executed by the processing device 108 to generate a relit image 210 of FIG. 23. The relighting of the combined image 194 can be adjusted by the user via the user interface 114 (e.g., one or more sliders of the interface) and/or automatically by the system 100 via the relighting module 168. In the combined image 194 of FIG. 22, the relighting intensity slider of the user interface 114 can be at about 0%, and in the relit image 210 of FIG. 23, the relighting intensity can be at about 100% with the foreground 402 lighting matching the scene of the replacement background 406 in a realistic manner.

Figure 24:
FIG. 24 is an exemplary combined image in accordance with the present disclosure.

As a further example, FIG. 24 is a combined image 194 with a replacement background 406. In some instances, adjusting the contrast and/or exposure of the entire image 194 may provide unrealistic results with both the foreground 402 and replacement background 406 being simultaneously adjusted. As such, it may be desired to adjust the contrast and/or exposure of only the foreground 402 or only the replacement background 406. In such instances, the exposure module 156 can be executed by the processing device 108 in combination with the respective background module 160 or foreground module 162 (depending on which features are to be adjusted) to generate an exposure (or contrast) adjusted image 188. The neural network mask 174 allows for independent adjustment of characteristics of the foreground 402 and replacement background 406 either manually via one or more sliders or value input boxes at the user interface 114 and/or automatically via the system 100.

Figure 25:
FIG. 25 is an exemplary exposure adjusted image in accordance with the present disclosure.
Figure 26:
FIG. 26 is an exemplary contrast adjusted image in accordance with the present disclosure.
Figure 27:
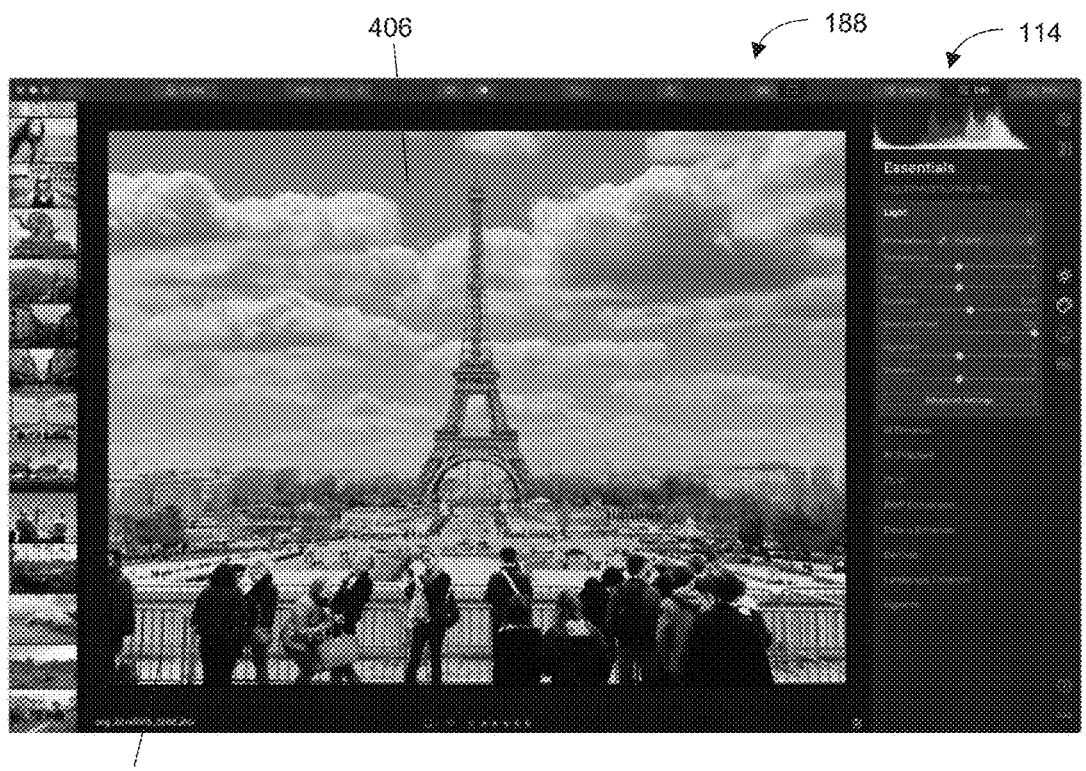
FIG. 27 is an exemplary contrast adjusted image in accordance with the present disclosure.

For example, FIG. 25 is an image 188 with the replacement background 406 exposure adjusted without affecting the exposure of the foreground 402. FIG. 26 is an image 188 with the foreground 402 contrast adjusted without affecting the contrast of the replacement background 406. FIG. 27 is an image 188 with the foreground 402 exposure adjusted without affecting the exposure of the replacement background 406. Adjustments to the foreground 402 and/or the background 406 can thereby be independently controlled to achieve realistic results. Although discussed herein as being used to independently control the exposure or contrast of the image 194, in some embodiments, any characteristics of the image 194 can be independently controlled (e.g., brightness, contrast, detail, color, or the like of the foreground 402 and replacement background 406), and special effects can be independently applied to the foreground 402 and replacement background 406.

Figure 28:
FIG. 28 is an exemplary defocused image in accordance with the present disclosure.

As a further example, based on the defocused nature of one or more portions of the foreground 402, the replacement background 406 may appear unrealistic. In such instances, as discussed above, the defocus module 202 can be executed by the processing device 108 to generate a defocused image 202. FIG. 20 illustrates a combined image 194 with a clear or crisp replacement background 406, and FIG. 28 illustrates a defocused image 202 with clouds and sky defocused for a more realistic result. The level or intensity of defocus of the replacement background 406 can be selected by the user via the user interface 114 and/or automatically by the system 100.

Figure 29:
FIG. 29 is an exemplary flipped image in accordance with the present disclosure.

As a further example, it may be desired to flip the replacement background 406 along an x-axis or a y-axis (e.g., vertical or horizontal flip). In such instances, the flip module 154 can receive as input the combined image 194, and is executed by the processing device 108 to generate a flipped image 208. FIG. 22 illustrates a combined image 194, and FIG. 29 illustrates a flipped image 208 with the replacement background 406 flipped along a y-axis. The axis along which the replacement background 406 is flipped can be selected at, e.g., a checkbox at the user interface 114.

Figure 30:
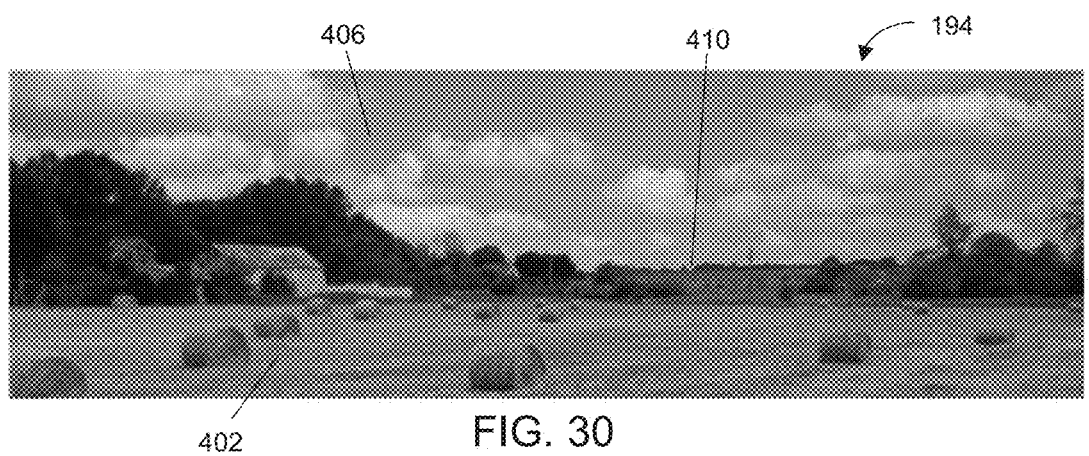
FIG. 30 is an exemplary combined image in accordance with the present disclosure.
Figure 31:
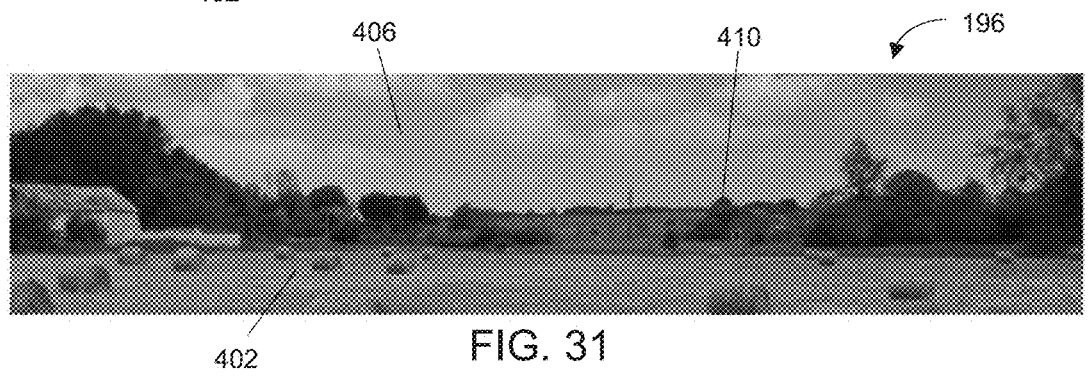
FIG. 31 is an exemplary blended image in accordance with the present disclosure.
Figure 32:
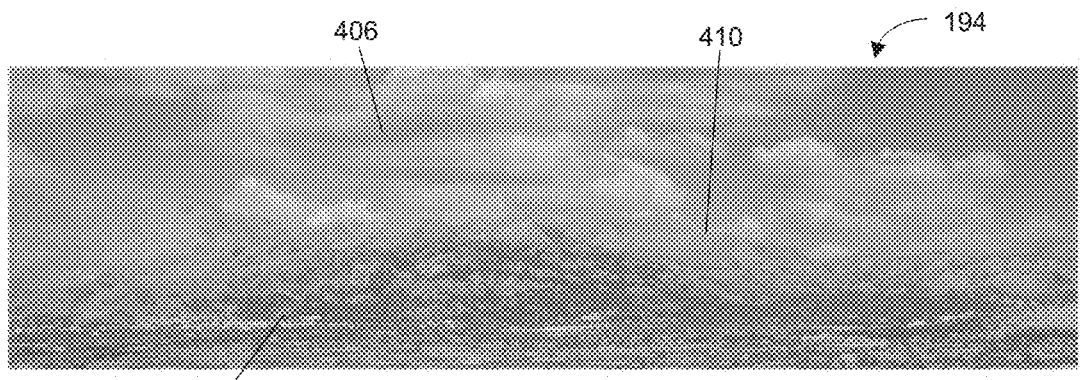
FIG. 32 is an exemplary combined image in accordance with the present disclosure.
Figure 33:
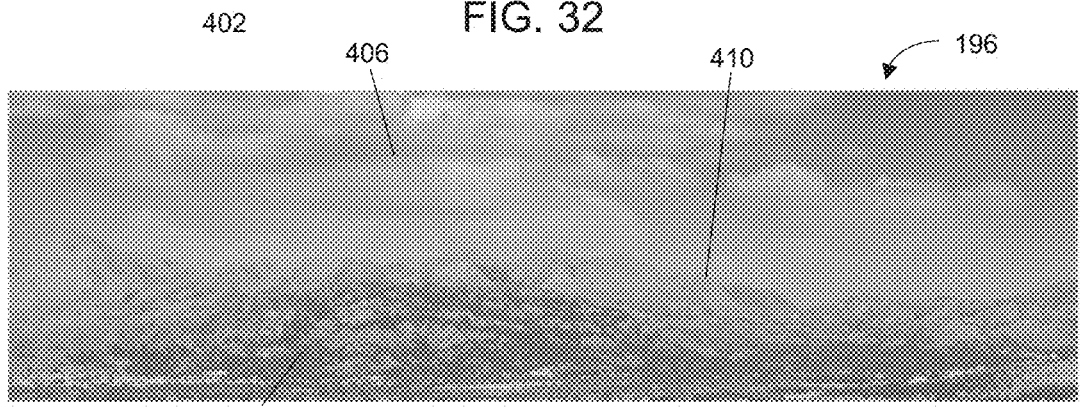
FIG. 33 is an exemplary blended image in accordance with the present disclosure.

As a further example, FIGS. 30 and 32 are combined images 194 including a foreground 402 and a replacement background 406. Due to the crispness of the replacement background 406 at the horizon or border 410, the image 194 may appear unrealistic. In such instances, the horizon blending module 146 can be executed by the processing device 108 to blend the replacement background 406 with the foreground 402 at or near the border 410 to ensure a more realistic output image. FIG. 31 is the blended image 196 for FIG. 30, and FIG. 33 is the blended image 196 for FIG. 32, with the blending at the border 410 providing a realistic effect and smooth transition from the replacement background 406 to the foreground 402. The level or intensity of the blending can be selected by the user at the user interface 114 and/or automatically by the system 100. The blending level or intensity in FIGS. 30 and 32 can be at about 0%, and about 100% in FIGS. 31 and 33.

Figure 34:
FIG. 34 is an exemplary input original image in accordance with the present disclosure.
Figure 35:
FIG. 35 is an exemplary combined image in accordance with the present disclosure.
Figure 36:
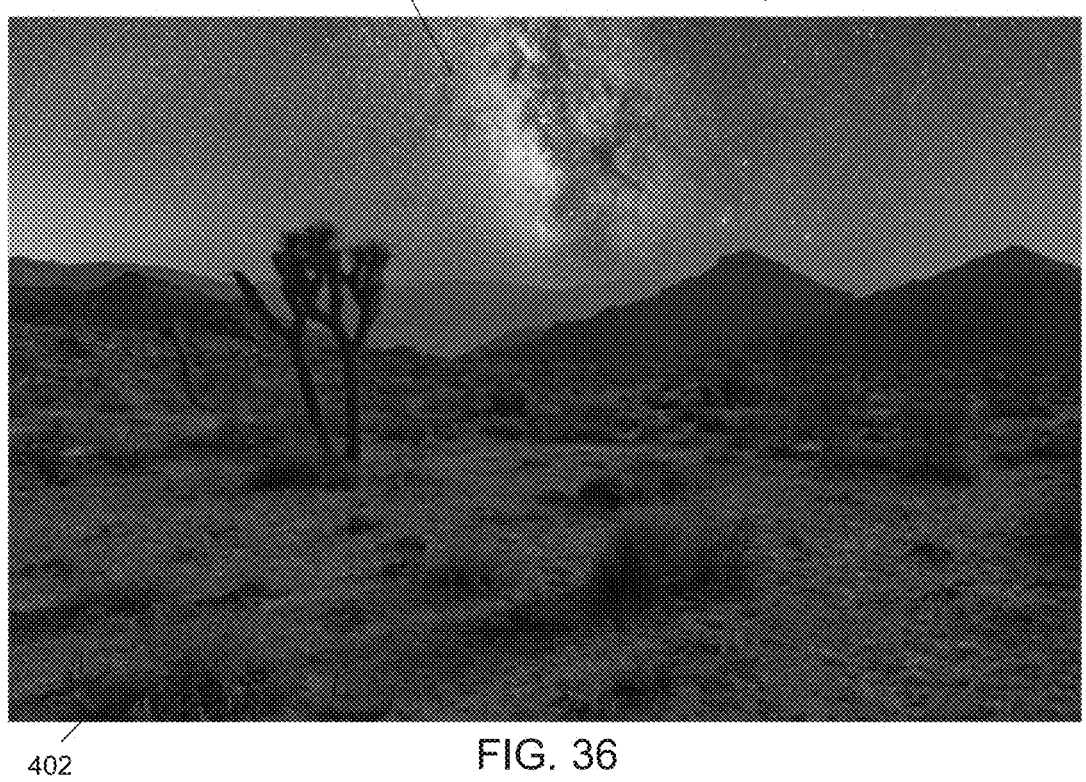
FIG. 36 is an exemplary tone image in accordance with the present disclosure.

As a further example, FIG. 34 is an input original image 170 having a background 400 and a foreground, and FIG. 36 is a combined image 194 having the foreground 402 and a replacement background 406. It may be desirable to adjust the hue, tone or temperature of the combined image 194 (e.g., the replacement background 406 of the combined image 194) to better match the input original image 170 hue, tone or temperature. In such instances, the tone module 158 can be executed by the processing device 108 to generate a tone image 198. FIG. 36 is a tone image 198 having a warmer color temperature of the replacement background 406 as compared to the replacement background 406 of the combined image 194.

Figure 37:
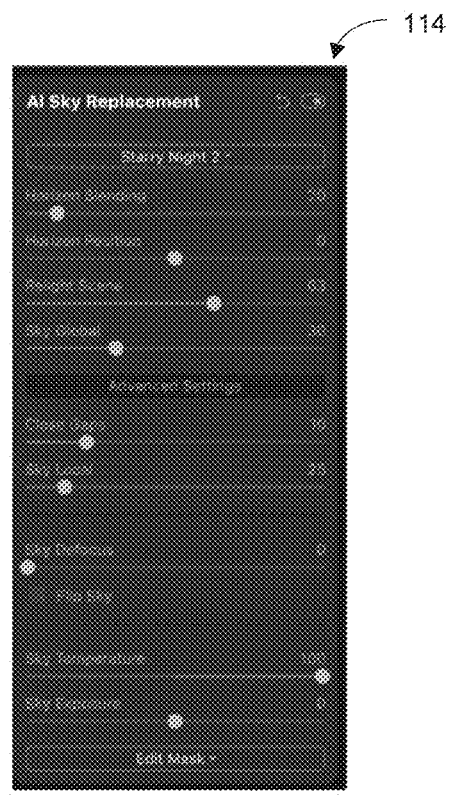
FIG. 37 is an exemplary user interface with settings for a warm color temperature in accordance with the present disclosure.
Figure 38:
FIG. 38 is an exemplary tone image in accordance with the present disclosure.
Figure 39:
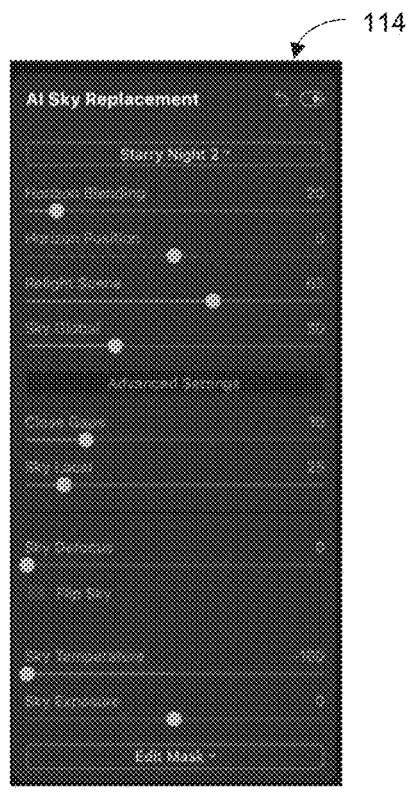
FIG. 39 is an exemplary user interface with settings for a cool color temperature in accordance with the present disclosure.

FIG. 37 is a screenshot illustrating a user interface 114 of the system 100 with controls for setting color temperatures of the replacement background 406 of FIG. 36. The controls or adjustments of the user interface 114 allow a user to achieve the warmer color temperature illustrated in FIG. 36 including, e.g., horizon blending, horizon position, relight scene, sky global, close gaps, sky local, sky defocus, sky temperature, sky exposure, combinations thereof, or the like. In some embodiments, one or more of the controls can be in the form of a slider capable of being positioned at −100% to 100%. The sky temperature control is adjusted to 100%. In some embodiments, the adjustment of the user interface 114 can be controlled via user input at the user interface 114 and/or automatically by the system 100. FIG. 38 is a tone image 198 having a cooler color temperature of the replacement background 406 as compared to the replacement background 406 of the combined image 194. FIG. 39 is a screenshot illustrating a user interface 114 with settings for various controls for the warmer color temperature of the replacement background 406 of FIG. 38. The sky temperature control is adjusted to −100%.

Figure 40:
FIG. 40 is an exemplary mixed image in accordance with the present disclosure.

As a further example, it may be desirable to not only replace the original sky with a new sky, but also to add additional features, objects or details to the new sky. The new sky can be blended with the original sky and new objects can be added to the new sky, such as, e.g., new clouds, fireworks, lightning, rainbow, or any other object. FIG. 40 is a mixed image 212 generated by the mixing module 164, the mixed image 212 including the replacement background 406 and a new object 414 augmented into the image 212 in a realistic manner. Natural integration of the object 414 into the image 212 is performed by the system 100 without additional masking.

Figure 41:
FIG. 41 is an exemplary combined image in accordance with the present disclosure.

In some embodiments, additional adjustments or enhancements to the combined image 194 can be made by the system 100. For example, a strong difference may exist between the original image (e.g., the original foreground 402) and the replacement background 406, with such differences being noticeable and resulting in an unrealistic image 194. Generally, a real sky includes at least some haze. The system 100 can include a setting for adjusting the haze of the daytime replacement sky. FIG. 41 is a combined image 194 without haze added to the replacement background 406. Relative to the foreground 402, the contrast and color of the replacement background 406 can appear too different for a realistic image. The processing device can execute the haze module 165 to receive as input the combined image 194, and generate the haze adjusted image 216 of FIG. 42. The haze module 165 can adjust the haze and/or brightness of the combined image 194 to output a more realistic image 216.

Figure 42:
FIG. 42 is an exemplary haze adjusted image in accordance with the present disclosure.

In some embodiments, for daytime blue skies, the haze module 165 can create a first layer (e.g., Layer 0) filled with a haze color, such as pure which in the example of FIG. 42. A second layer (e.g., Layer 1) can include texture of the replacement background 406 with a transparency value. In some embodiments, the transparency of the replacement background 406 can be set as about 70%, although the transparency value can be adjusted or customized by the system 100 and/or the user based on the images involved. By using the pure white layer in combination with the partially transparent replacement background 406, the overall brightness of the sky can be adjusted without moving beyond the limits of the ranges of white colors that are already in the original image 170.

Figure 43:
FIG. 43 is an exemplary combined image in accordance with the present disclosure.
Figure 44:
FIG. 44 is an exemplary haze adjusted image in accordance with the present disclosure.

Instead, light bright haze is added to the replacement background 406. Adding a light haze allows the system 100 to adjust the overall brightness of the sky to the original image 170 and adds realism to the scene due to the fact that the new sky (e.g., replacement background 406) may appear too perfect or crisp in colors. Although pure white is used as the color for the haze layer, it should be understood any color could be used depending on the type of images being enhanced. White color may be suitable for daytime skies. For a sunset or other type of sky, a different base haze color can be used. FIGS. 43 and 44 are additional examples of combined images 194 and haze adjusted images 216 after application of a haze to the replacement background 406.

In some embodiments, the processing device 108 can execute a grain module 167 to receive as input the combined image 194, and generate the grain adjusted image 218. The grain module 167 can add texture on the palate with noise to match noise of the original image 170. Therefore, zooming in on the grain adjusted image 218 provides a substantially similar texture for the foreground 402 and the replacement background 406.

Figure 45:
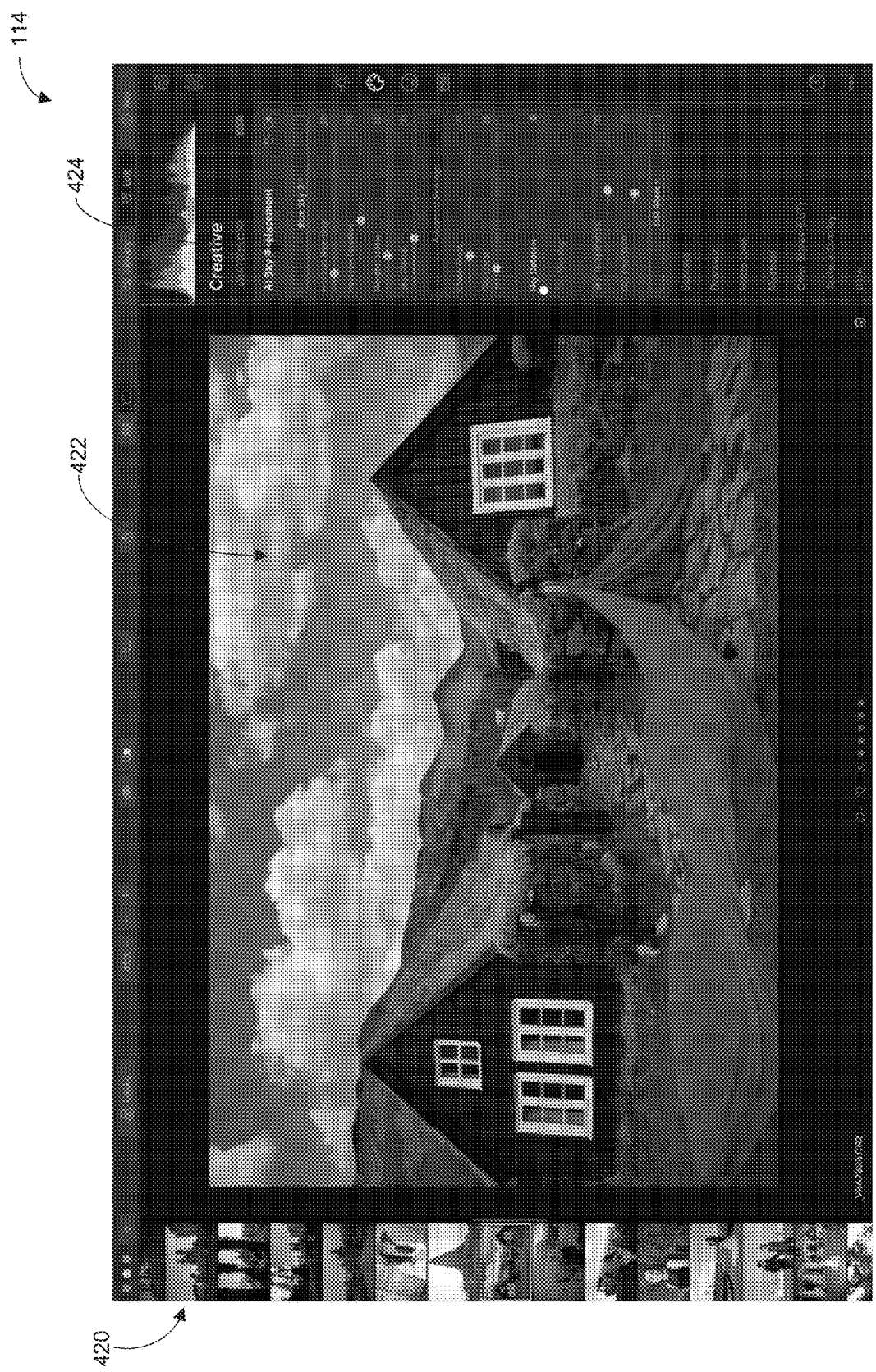
FIG. 45 is an exemplary user interface in accordance with the present disclosure.

FIG. 45 is a screenshot illustrating a user interface 114 in accordance with the present disclosure. The user interface 114 includes an image selection section 420 including multiple imported images for potential editing. The user interface 114 includes an image section 422 including a single image to be edited by the system 100. The user interface 114 includes an adjustment section 424 including multiple controls in the form of, e.g., sliders, check boxes, input boxes, preset adjustments, combinations thereof, or the like, for various setting controls associated with the image in the image section 422.

Figure 46:
FIG. 46 is an exemplary user interface with an original input image in accordance with the present disclosure.
Figure 47:
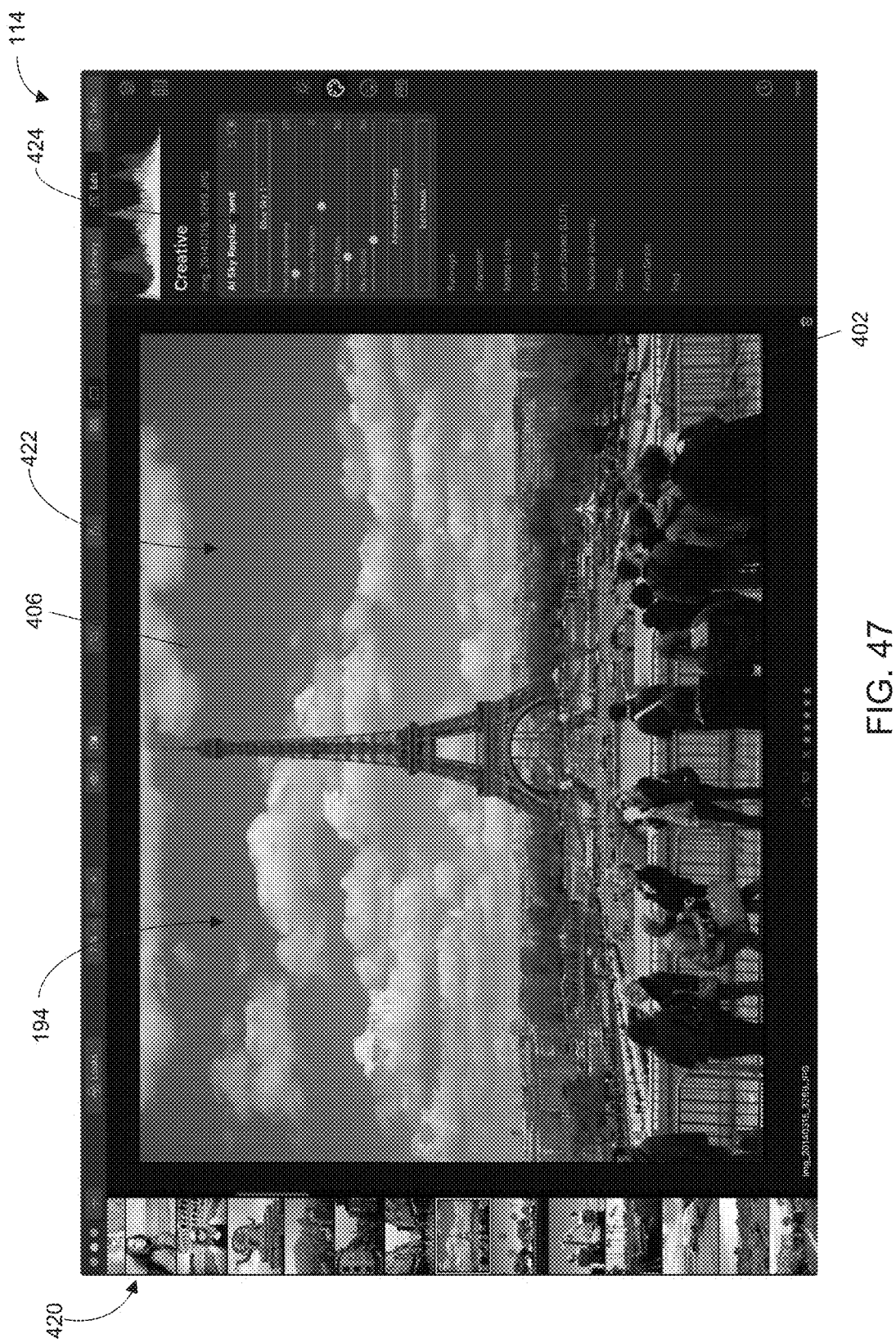
FIG. 47 is an exemplary user interface with a combined image in accordance with the present disclosure.
Figure 48:
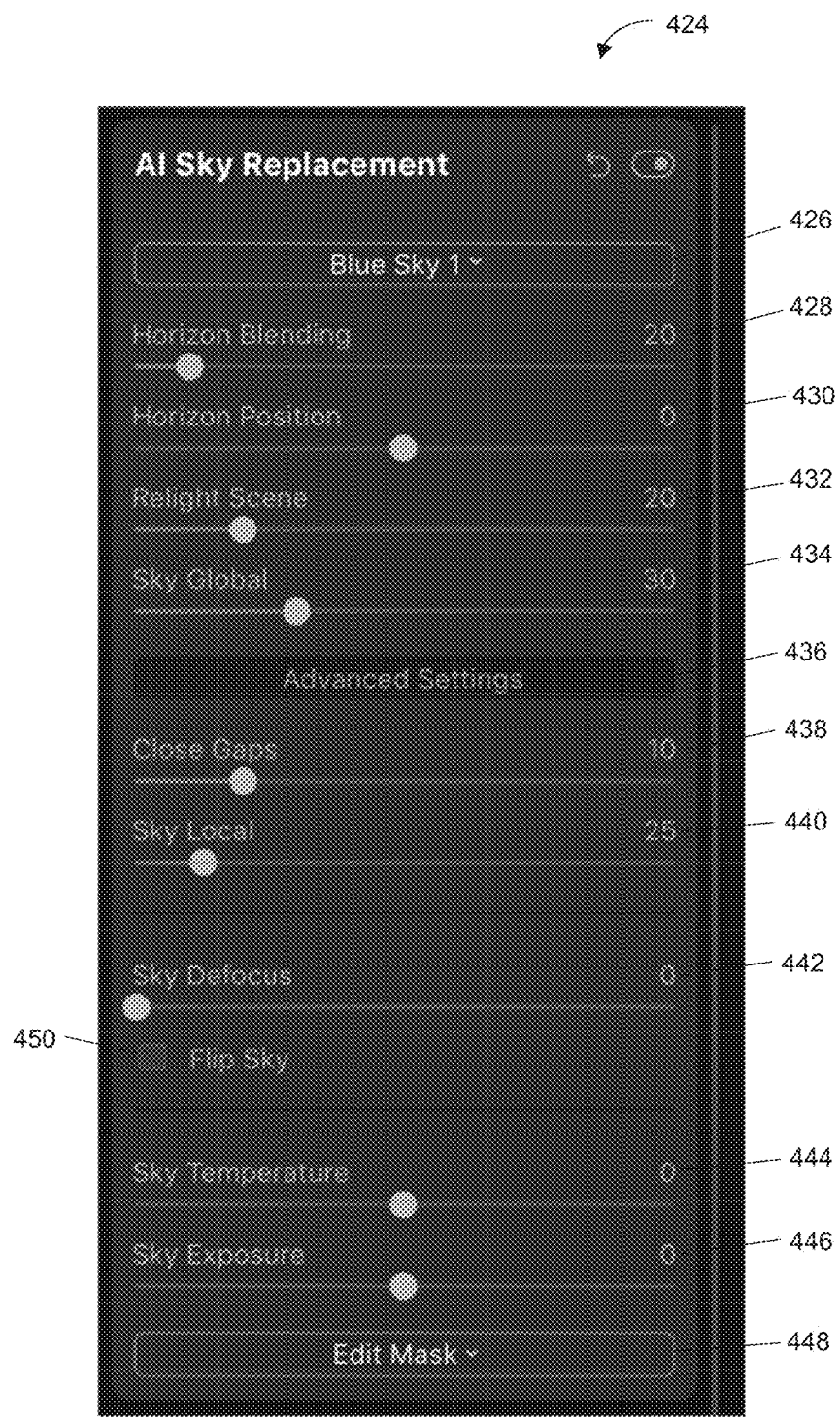
FIG. 48 is an exemplary adjustment section of a user interface in accordance with the present disclosure.

FIG. 46 is a screenshot illustrating a user interface 114 including an original input image 170 in the image section 422, the original input image 170 including a foreground 402 and an original background 400 sky. FIG. 47 is a screenshot illustrating the user interface 114 including a combined image 194 including the foreground 402 and a replacement background 406 sky. FIG. 48 is a screenshot illustrating a detailed view of the adjustment section 424 with characteristic settings for the replacement background 406. The adjustment section 424 includes a background selection section 426 with a drop-down menu that can be used to select from a list of different replacement backgrounds. For example, rather than the background shown in FIG. 46, the background selection section 426 can be used to select a different replacement background (see, e.g., FIG. 22). The adjustment section 424 includes slider selectors for gradual selection of horizon blending 428, horizon position 430, relight scene 432, sky global 434, close gaps 438, sky local 440, sky defocus 442, sky temperature 444, and sky exposure 446. In some embodiments, the sky local 440 setting can be used to fill in areas of the image adjacent to edges of the sky if gaps exist after the background replacement process. In some embodiments, the close gaps 438 setting can be used to correct, remove or enhance artifact occurrences on the horizon or on the foreground 402 if such artifacts occur during the background replacement process. The adjustment section 424 includes an advanced settings section 434, a checkbox for flip sky 450, and an edit mask section 448. The edit mask section 448 can be used to adjust the neural network mask 174. For example, the edit mask section 448 can allow a user to manually adjust the replacement sky or background 406 (e.g., by selecting and dragging one or more portions of the neural network mask 174) to adjust where the replacement background 406 is placed. In some embodiments, the edit mask section 448 can be used to manually remove one or more portions of the replacement background 406 and/or add the replacement background 406 to one or more portions of the image where the system 100 did not previously add the replacement background 406. In some embodiments, the edit mask section 448 can provide the user with a brush to draw or select a section of the image that should be included or excluded from the mask. For example, the edit mask section 448 can be used to manually fix or edit the mask generated by the system 100. As discussed above, the replacement background 406 can be adjusted by, e.g., shifting the horizon position along a vertical y-axis (see, e.g., FIG. 21).

In some embodiments, after adjustments have been made to one image to create a final image with a replacement background 406 and (optionally) additional adjustments performed by the user and/or the system 100, it may be desirable to automatically apply the same adjustments to one or more other input original images 170 in the system 100. The system 100 provides an efficient process for applying or copying the same adjustments to one or more input original images 170 without having to repeat the editing steps again. The user interface 114 includes the image selection section 420 (e.g., an image filmstrip in FIG. 48) or an image context menu (e.g., a gallery view) for viewing multiple edited and unedited images.

Figure 49:
FIG. 49 is an exemplary image context menu of a user interface in accordance with the present disclosure.
Figure 50:
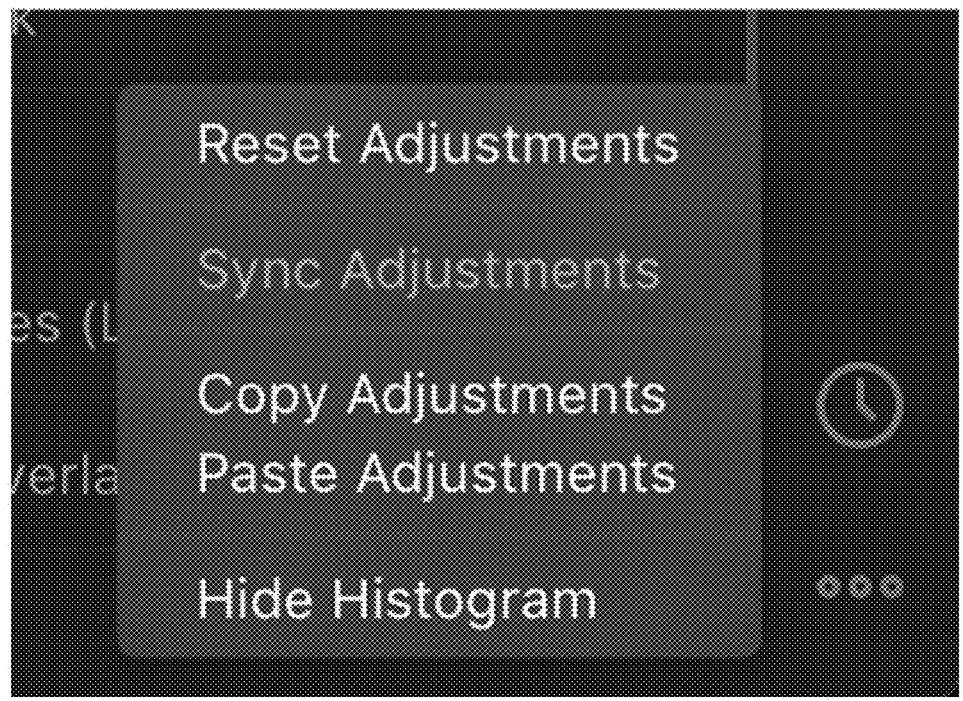
FIG. 50 is an exemplary detailed submenu of a user interface in accordance with the present disclosure.
Figure 51:
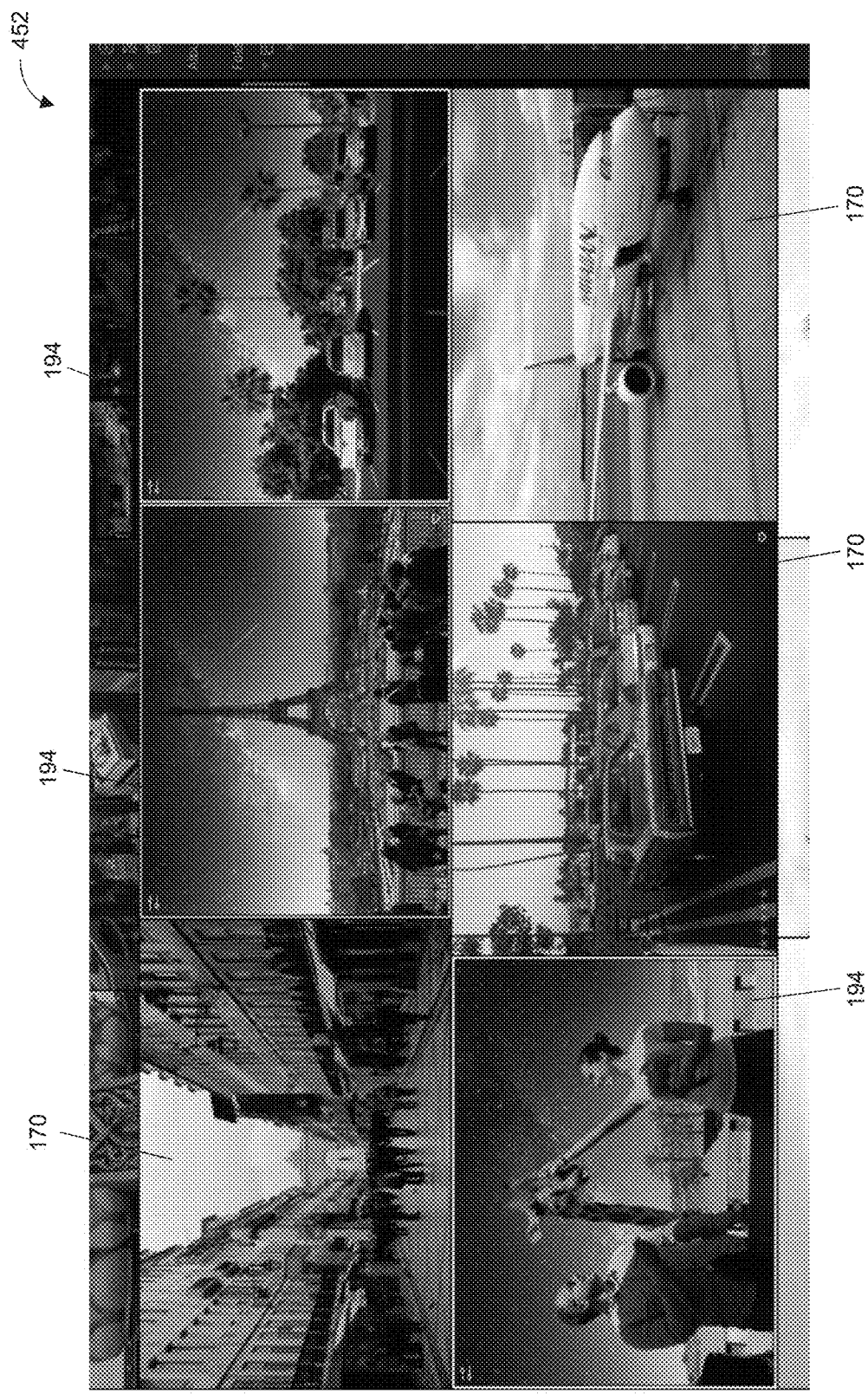
FIG. 51 is an exemplary image context menu of a user interface in accordance with the present disclosure.

FIG. 49 is a screenshot illustrating a detailed view of an image context menu 452 of the user interface 114. The image context menu 452 of FIG. 50 includes an edited combined image 194 with a replacement background and multiple input original images 170 with original backgrounds. A submenu 454 can be selected by the user by right-clicking on the combined image 194, choosing adjustments, and copy adjustments to copy the adjustments (including the replacement background) of the combined image 194. Next, the user can select the input original images 170 in the image context menu 452 for which the same adjustments will be applied and, as shown in FIG. 50, right-clicking on the selected images 170 generates a submenu 456. The submenu 456 can be used to choose copy adjustments to apply or sync the same adjustments to the selected original images 170. FIG. 51 is a detailed view of the image context menu 452 with multiple combined images 194 having the copied or synced adjustments applied from the first combined image 194. The copied or synced adjustments include insertion of the replacement background, as well as any other characteristic adjustments saved to the first combined image 194 (e.g., manual adjustments via the adjustment section 424).

Figure 52:
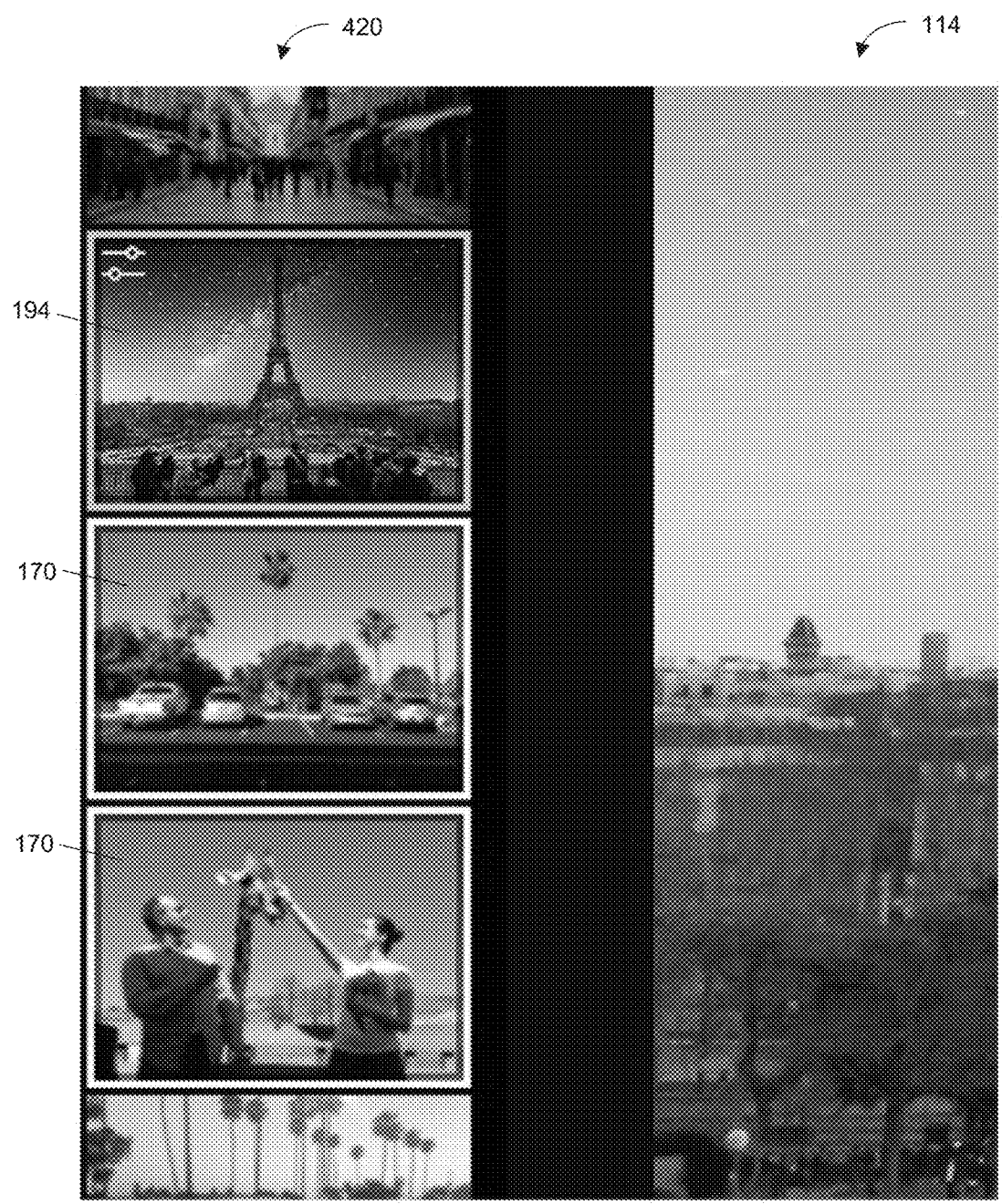
FIG. 52 is an exemplary image selection section of a user interface in accordance with the present disclosure.
Figure 53:
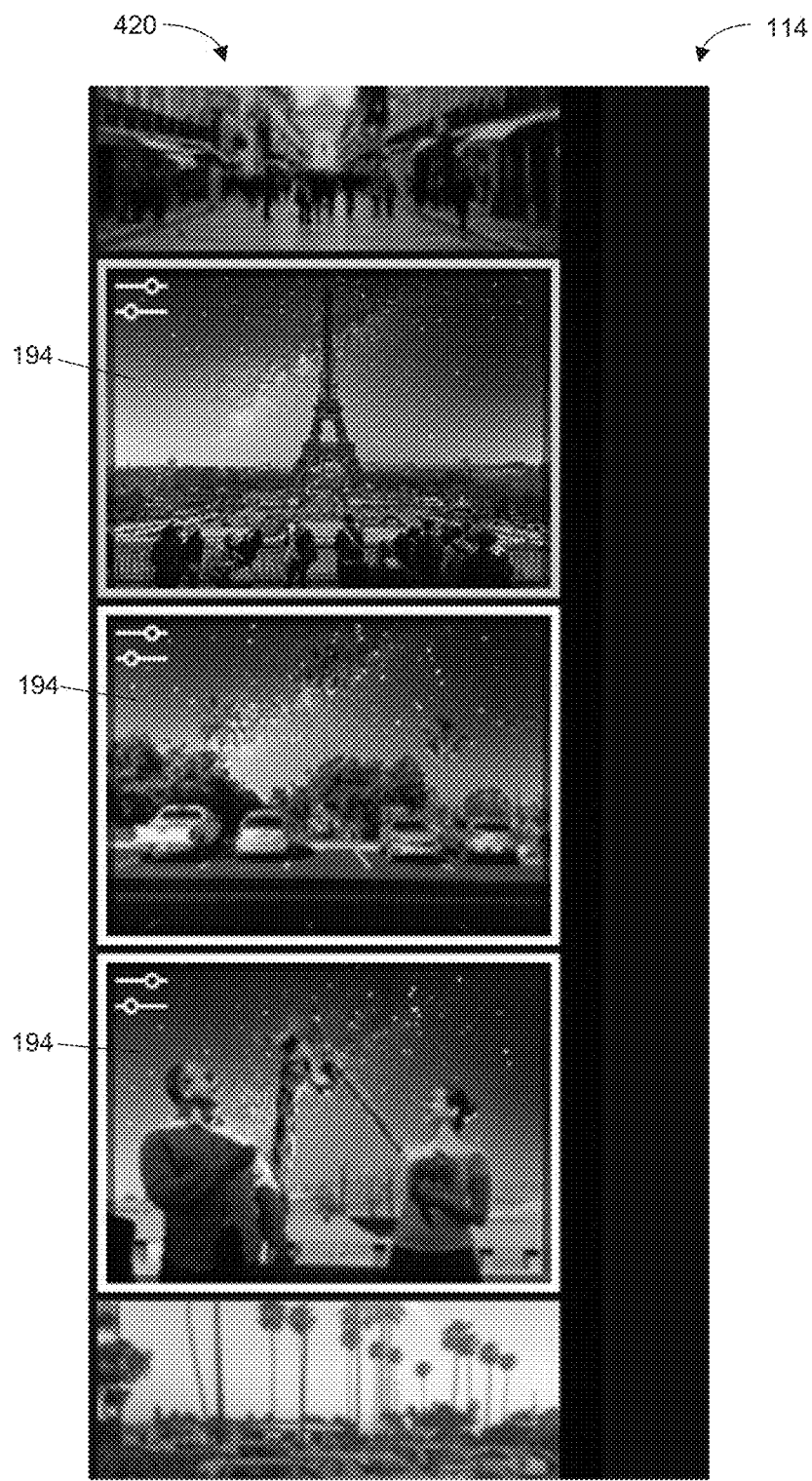
FIG. 53 is an exemplary image selection section of a user interface in accordance with the present disclosure.

FIG. 52 is a screenshot illustrating a detailed view of an image selection section 420 of the user interface 114 including a combined image 194 with a replacement background and multiple input original images 170 with original backgrounds. A submenu 454 (see, e.g., FIG. 49) can be generated in a similar manner as described above in the image selection section 420 to copy adjustments or enhancements of the combined image 194. The desired original images 170 can be selected in the image selection section 420 and the submenu 456 (see, e.g., FIG. 50) can be used to copy, apply or sync the adjustments/enhancements to the selected original images 170. FIG. 53 is a screenshot illustrating the image selection section 420 with the adjustments copied or synced to two original images 170. The process of copying the adjustments or enhancements to additional original images 170 in the system can thereby be provided in an efficient and convenient manner.

Figure 54:
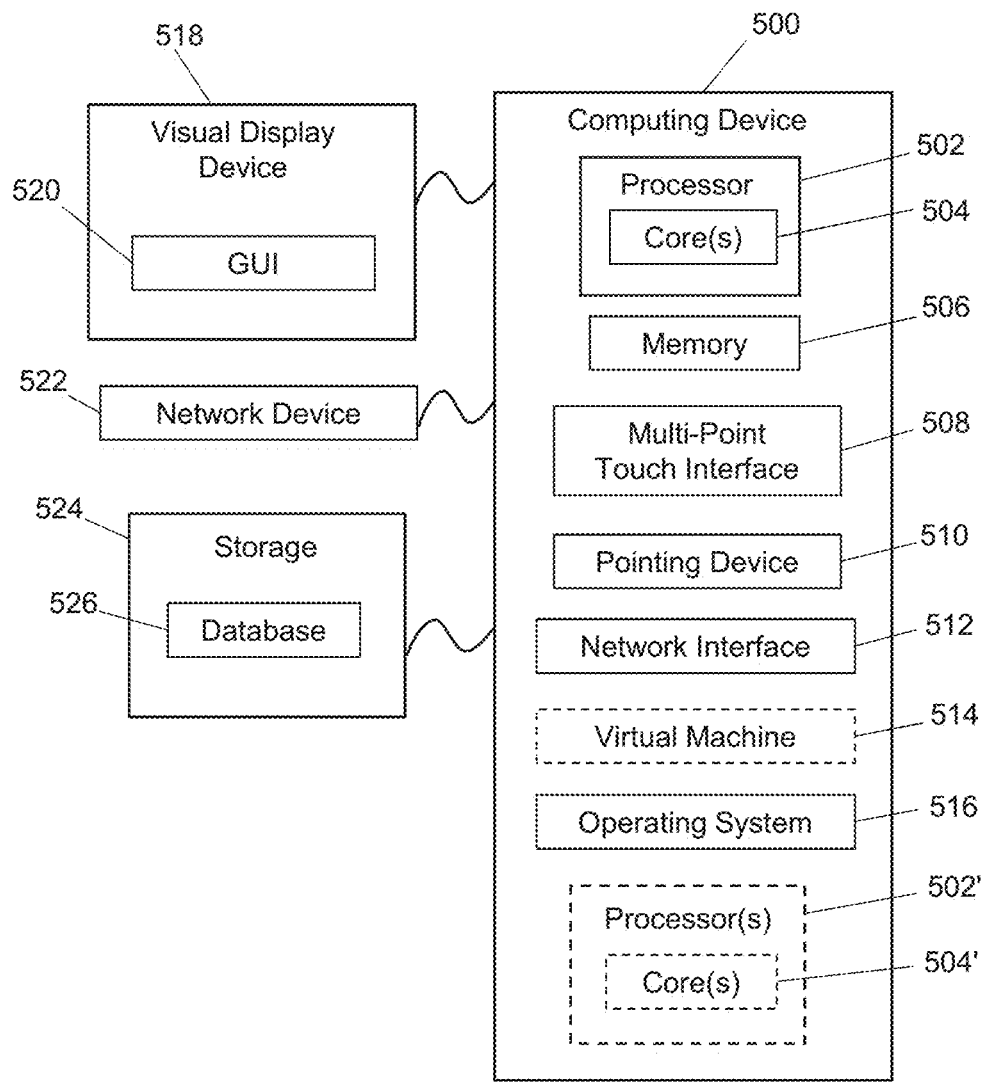
FIG. 54 is a block diagram of an exemplary computing device for implementing the exemplary system for selective replacement of objects in images in accordance with the present disclosure.

FIG. 54 is a block diagram of a computing device 500 (e.g., a mobile device, a smart device, a computer, or the like) in accordance with exemplary embodiments of the present disclosure. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the present disclosure (e.g., instructions for operating the camera, instructions for operating the modules, instructions for operating the database, instructions for operating the processing device, instructions for operating the communication interface, instructions for operating the user interface, instructions for operating the central computing system, instructions for operating the neural network, combinations thereof, or the like). The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device 500 may be shared dynamically. A virtual machine 514 may be provided to handle a process running on multiple processors so that the process appears to be using only one computing resource rather than multiple computing resources. Multiple virtual machines may also be used with one processor. Memory 506 may include a computer system memory or random access memory, such as DRAM, SRAM, EDO RAM, and the like. Memory 506 may include other types of memory as well, or combinations thereof.

A user may interact with the computing device 500 through a visual display device 518 (e.g., a personal computer, a mobile smart device, or the like), such as a computer monitor, which may display at least one user interface 520 (e.g., a graphical user interface) that may be provided in accordance with exemplary embodiments. The computing device 500 may include other I/O devices for receiving input from a user, for example, a camera, a keyboard, microphone, or any suitable multi-point touch interface 508, a pointing device 510 (e.g., a mouse), or the like. The input interface 508 and/or the pointing device 510 may be coupled to the visual display device 518. The computing device 500 may include other suitable conventional I/O peripherals.

The computing device 500 may also include at least one storage device 524, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the system described herein. Exemplary storage device 524 may also store at least one database 526 for storing any suitable information required to implement exemplary embodiments. For example, exemplary storage device 524 can store at least one database 526 for storing information, such as data relating to the cameras, the modules, the databases, the central computing system, the communication interface, the processing device, the neural networks, the user interface, combinations thereof, or the like, and computer-readable instructions and/or software that implement exemplary embodiments described herein. The databases 526 may be updated by manually or automatically at any suitable time to add, delete, and/or update one or more items in the databases.

The computing device 500 can include a network interface 512 configured to interface via at least one network device 522 with one or more networks, for example, a Local Area Network (LAN), a Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 may include a built-in network adapter, a network interface card, a PCMCIA network card, Pa CI/PCIe network adapter, an SD adapter, a Bluetooth adapter, a card bus network adapter, a wireless network adapter, a USB network adapter, a modem or any other device suitable for interfacing the computing device 500 to any type of network capable of communication and performing the operations described herein. Moreover, the computing device 500 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 500 may run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 516 may be run in native mode or emulated mode. In an exemplary embodiment, the operating system 516 may be run on one or more cloud machine instances.

Figure 55:
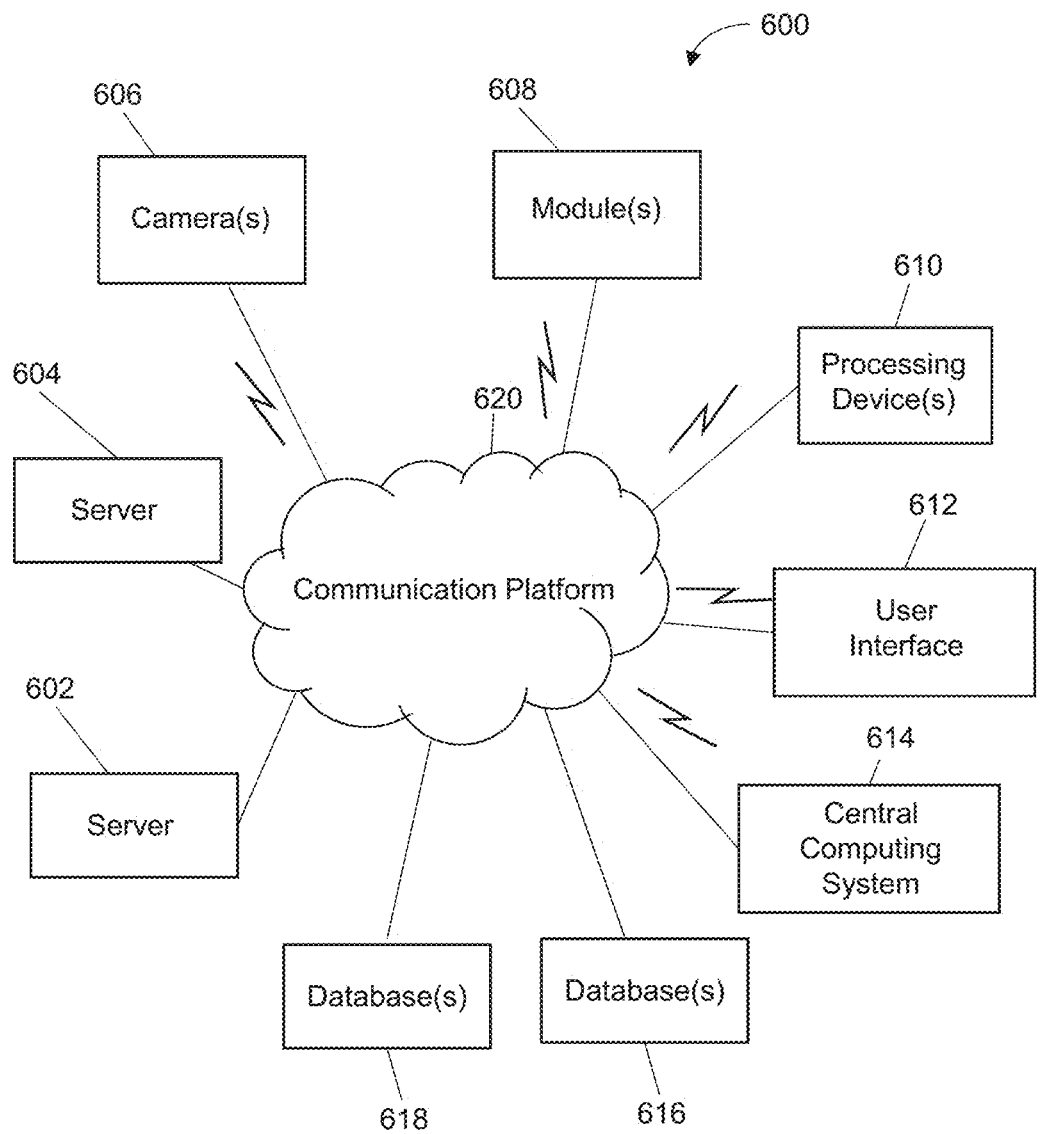
FIG. 55 is a block diagram of an exemplary system for selective replacement of objects in images environment in accordance with the present disclosure.

FIG. 55 is a block diagram of an exemplary system for selective replacement of objects in images environment 600 in accordance with exemplary embodiments of the present disclosure. The environment 600 can include servers 602, 604 configured to be in communication with one or more cameras 606, one or more modules 608, at least one processing device 610, a user interface 612, and a central computing system 614 via a communication platform 620, which can be any network over which information can be transmitted between devices communicatively coupled to the network. For example, the communication platform 620 can be the Internet, Intranet, virtual private network (VPN), wide area network (WAN), local area network (LAN), and the like. In some embodiments, the communication platform 620 can be part of a cloud environment.

The environment 600 can include repositories or databases 616, 618, which can be in communication with the servers 602, 604, as well as the one or more cameras 606, one or more modules 608, at least one processing device 610, a user interface 612, and a central computing system 614, via the communications platform 620. In exemplary embodiments, the servers 602, 604, one or more cameras 606, one or more modules 608, at least one processing device 610, a user interface 612, and a central computing system 614 can be implemented as computing devices (e.g., computing device 500). Those skilled in the art will recognize that the databases 616, 618 can be incorporated into at least one of the servers 602, 604. In some embodiments, the databases 616, 618 can store data relating to the database 104, and such data can be distributed over multiple databases 616, 618.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for selective replacement of an object in an image, the system comprising:
    an interface configured to receive as input an original image and a background image; and
    a processing device in communication with the interface, the processing device configured to:
        (i) process the original image using a neural network to detect one or more objects in the original image;
        (ii) generate a neural network mask of the original image for the one or more objects in the original image;
        (iii) generate a filtered original image including the original image without the one or more objects;
        (iv) generate a modulated background image including a replacement background based on the neural network mask; and
        (v) generate a combined image including the filtered original image combined with the modulated background image.

2. The system of claim 1, wherein the original image includes a foreground and a background, wherein the one or more objects include the background of the original input.

3. The system of claim 2, wherein the one or more objects include a sky in the original image.

4. The system of claim 2, wherein the processing device extracts the foreground from the original image.

5. The system of claim 2, wherein the processing device generates a refined mask for each pixel of the original image associated with the background.

6. The system of claim 5, wherein the processing device generates a dilated mask including a dilation or indentation from a border extending between the foreground and the background.

7. The system of claim 6, wherein the processing device generates an interpolation grid corresponding to the foreground.

8. The system of claim 7, wherein the processing device generates an extracted image including the original image with the foreground extracted based on the interpolation grid.

9. The system of claim 7, wherein processing device generates the filtered original image by extracting the foreground of the original image based on the interpolation grid.

10. The system of claim 1, wherein the processing device generates a blended image, the blended image including a smooth transition between the filtered original image and the modulated background image.

11. The system of claim 1, wherein the processing device generates a toned image, the toned image including the combined image with adjustment of tone within the combined image.

12. The system of claim 1, wherein the processing device generates a tint unified image, the tint unified image including tint correction at edges between the filtered original image and the modulated background image.

13. The system of claim 1, wherein the processing device adjusts one or more characteristics of the filtered original image independently from one or more characteristics of the modulated background image.

14. The system of claim 1, wherein the interface includes an image selection section with the combined image and one or more additional original images.

15. The system of claim 14, wherein the interface includes a first submenu for selecting the combined image and copying the adjustments or enhancements applied to the combined image, and the interface includes a second submenu for selecting one or more of the additional original images and applying the copied adjustments or enhancements of the combined image to the selected one or more of the additional original images.

16. A method for selective replacement of an object in an image, the method comprising:

receiving as input at an interface an original image and a background image;

detecting one or more objects in the original image with a neural network;

generating a neural network mask of the original image for the one or more objects in the original image;

generating a filtered original image, the filtered original image including the original image without the one or more objects;

generating a modulated background image, the modulated background image including a replacement background based on the neural network mask; and generating a combined image, the combined image including the filtered original image combined with the modulated background image.

17. The method of claim 16, comprising adjusting one or more characteristics of the filtered original image independently from one or more characteristics of the modulated background image.

18. The method of claim 16, comprising receiving at the interface one or more additional original images, wherein the interface includes an image selection section with the combined image and the one or more additional original images.

19. The method of claim 18, comprising selecting the combined image and copying the adjustments or enhancements applied to the combined image at a first submenu of the interface, and selecting one or more of the additional images and applying the copied adjustments or enhancements of the combined image to the selected one or more of the additional images at a second submenu of the interface.

20. A non-transitory computer-readable medium storing instructions at least for selective replacement of an object in an image that are executable by a processing device, wherein execution of the instructions by the processing device causes the processing device to:

receive as input at an interface an original image and a background image;

detect one or more objects in the original image with a neural network;

generate a neural network mask of the original image for the one or more objects in the original image;

generate a filtered original image, the filtered original image including the original image without the one or more objects;

generate a modulated background image, the modulated background image including a replacement background based on the neural network mask; and generate a combined image, the combined image including the filtered original image combined with the modulated background image.

\* \* \* \* \*